(12) United States Patent
Askar et al.

(10) Patent No.: US 11,038,619 B2
(45) Date of Patent: Jun. 15, 2021

(54) RADIO FREQUENCY COMMUNICATION AND JAMMING DEVICE AND METHOD FOR PHYSICALLY SECURED FRIENDLY RADIO FREQUENCY COMMUNICATION AND FOR JAMMING HOSTILE RADIO FREQUENCY COMMUNICATION

(71) Applicant: Fraunhofer-Gesellschaft zur Förderung der angewandten Forschung e.V., München (DE)

(72) Inventors: Ramez Askar, Berlin (DE); Wilhelm Keusgen, Berlin (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/703,345

(22) Filed: Dec. 4, 2019

(65) Prior Publication Data
US 2020/0106545 A1 Apr. 2, 2020

Related U.S. Application Data

(63) Continuation of application No. PCT/EP2018/064749, filed on Jun. 5, 2018.

(30) Foreign Application Priority Data

Jun. 6, 2017 (EP) .................... 17400029

(51) Int. Cl.
*H04K 3/00* (2006.01)
*H04W 72/04* (2009.01)
*H04W 72/08* (2009.01)

(52) U.S. Cl.
CPC .......... *H04K 3/28* (2013.01); *H04W 72/0453* (2013.01); *H04W 72/082* (2013.01); *H04K 2203/32* (2013.01)

(58) Field of Classification Search
CPC ........ H04K 2203/32; H04K 3/00; H04K 3/28; H04K 3/44; H04K 3/45; H04W 72/0453; H04W 72/082
(Continued)

(56) References Cited

U.S. PATENT DOCUMENTS 4,103,237 A * 7/1978 Fischer ..................... H04K 3/45
455/1
4,843,612 A * 6/1989 Brusch ................... H04B 1/713
375/133

(Continued)

FOREIGN PATENT DOCUMENTS

WO 2017-008851 A1 1/2017

OTHER PUBLICATIONS

Shyamnath Gollakota et al, "They Can Hear Your Heartbeats: Non-Invasive Security for Implantable Medical Devices", the ACM SIGCOMM 2011 Conference, 2011, pp. 2-13.

(Continued)

*Primary Examiner* — Tan H Trinh
(74) *Attorney, Agent, or Firm* — Novick, Kim & Lee, PLLC; Jae Youn Kim; Jihun Kim

(57) ABSTRACT

Disclosed is a radio frequency communication and jamming device configured for physically secured friendly radio frequency communication and for jamming hostile radio frequency communication, the radio frequency communication and jamming device including: an antenna arrangement having a transmission section for transmitting outgoing signals and a receiving section for receiving incoming signals; a receiver device configured for extracting an incoming information signal from the incoming signals received via the receiving section of the antenna arrangement in a receiving frequency band; a jamming generator configured for generating at least one jamming signal for (Continued)

jamming at least one jamming frequency band, wherein the jamming signal is transmitted as one of the outgoing signals via the transmission section, wherein the at least one jamming frequency band includes the receiving frequency band; and a self-interference cancellation device configured for cancelling portions of the at least one jamming signal in the incoming signals received via the receiving section at least in the receiving frequency band.

13 Claims, 9 Drawing Sheets

(58) Field of Classification Search
USPC ..... 455/1, 63.1, 114.2, 303; 342/16, 357.63; 375/133, 285
See application file for complete search history.

(56) References Cited

U.S. PATENT DOCUMENTS

| | | | | |
|---|---|---|---|---|
| 7,155,179 | B1* | 12/2006 | Rothenberg | H04B 1/525 455/114.2 |
| 8,543,053 | B1* | 9/2013 | Melamed | H04K 3/43 455/1 |
| 9,906,245 | B2* | 2/2018 | Brown | H04B 7/0894 |
| 10,439,755 | B1* | 10/2019 | Krunz | H04K 3/60 |
| 2002/0033766 | A1* | 3/2002 | Pratt | G01S 19/36 342/357.63 |
| 2006/0264168 | A1* | 11/2006 | Corbett | H04K 3/28 455/1 |
| 2008/0026689 | A1* | 1/2008 | Johnson | H04K 3/28 455/1 |
| 2008/0305735 | A1* | 12/2008 | Farnsworth | H04K 3/415 455/1 |
| 2009/0047897 | A1* | 2/2009 | Lagerman | H04K 3/42 455/1 |
| 2009/0325478 | A1* | 12/2009 | Sun | H04K 3/222 455/1 |
| 2010/0289688 | A1* | 11/2010 | Sherman | H04K 3/28 342/16 |
| 2012/0058729 | A1* | 3/2012 | Chang | G01S 19/215 455/63.1 |
| 2012/0252349 | A1* | 10/2012 | Kolinko | H04K 3/28 455/1 |
| 2013/0315341 | A1* | 11/2013 | Couillard | H04K 3/46 375/285 |
| 2014/0099908 | A1* | 4/2014 | Bornazyan | H04B 1/126 455/303 |
| 2014/0118116 | A1* | 5/2014 | Lavedas | H04K 3/43 340/10.3 |
| 2014/0165144 | A1* | 6/2014 | Kim | H04W 12/02 726/3 |
| 2014/0206279 | A1* | 7/2014 | Immendorf | H04K 3/41 455/1 |
| 2019/0103940 | A1* | 4/2019 | Kundu | H04W 4/80 |

OTHER PUBLICATIONS

Gan Zheng et al, "Improving Physical Layer Secrecy Using Full-Duplex Jamming Receivers", IEEE Transactions on Signal Processing, Oct. 15, 2013, pp. 4962-4974, vol. 61, No. 20.
Fengchao Zhu et al, "Joint Information- and Jamming-Beamforming for Physical Layer Security With Full Duplex Base Station", IEEE Transactions on Signal Processing, Dec. 15, 2014, pp. 6391-6401, vol. 62, No. 24.
Gaojie Chen et al, "Physical Layer Network Security in the Full-Duplex Relay System", IEEE Transactions on Information Forensics and Security, Mar. 3, 2015, pp. 574-583, vol. 10, No. 3.
Achaleshwar Sahai et al, "On the Impact of Phase Noise on Active Cancelation in Wireless Full-Duplex", IEEE Transactions on Vehicular Technology, Nov. 2013, pp. 4494-4510, vol. 62, No. 9.

Jung II Choi et al, "Achieving Single Channel, Full Duplex Wireless Communication", 2010, pp. 1-12.
Mohannad A. Khojastepour et al, "The Case for Antenna Cancellation for Scalable Full-Duplex Wireless Communications", 10th ACM Workshop on Hot Topics in Networks, 2011, pp. 17:1-17:6.
Mayank Jain et al, "Practical, Real-time, Full Duplex Wireless", 11th annual international conference on Mobile computing and networking, 2011, pp. 301-312.
Leo Laughlin et al, "Optimum Single Antenna Full Duplex Using Hybrid Junctions", IEEE Journal, Sep. 2014, pp. 1653-1661, vol. 32, No. 9.
Leo Laughlin et al, "Electrical Balance Isolation for Flexible Duplexing in 5G Mobile Devices", IEEE International Conference, Jun. 2015, pp. 1071-1076.
Leo Laughlin et al, "A Widely Tunable Full Duplex Transceiver Combining Electrical Balance Isolation and Active Analog Cancellation", Vehicular Technology Conference, May 2015, pp. 1-5.
Evan Everett et al, "Empowering Full-Duplex Wireless Communication by Exploiting Directional Diversity", ASILOMAR Conference, 2011, pp. 2002-2006.
Evan Everett et al, "Passive Self-Interference Suppression for Full-Duplex Infrastructure Nodes", IEEE Transactions on Wireless Communications, Feb. 2014, pp. 680-694, vol. 13, No. 2.
Tolga Dinc et al, "A 60 GHz Same-Channel Full-Duplex CMOS Transceiver and Link Based on Reconfigurable Polarization-Based Antenna Cancellation", Radio Frequency Integrated Circuits Symposium, 2015, pp. 31-34.
Achaleshwar Sahai et al, "Pushing the limits of Full-duplex: Design and Real-time Implementation", Technical Report, Jul. 2011, pp. 1-12.
Dani Korpi et al, "Advanced Self-interference Cancellation and Multiantenna Techniques for Full-Duplex Radios", 2013 Asilomar Conference, Nov. 2013, pp. 3-8.
Mikko Heino et al, "Recent Advances in Antenna Design and Interference Cancellation Algorithms for In-Band Full Duplex Relays", Communications Magazine, May 2015, pp. 91-101, vol. 53, No. 5.
K.E. Kolodziej et al, "Ring Array Antenna with Optimized Beamformer for Simultaneous Transmit and Receive", Antennas and Propagation Society International Symposium, Jul. 2012, pp. 1-2.
Nicholas A. Estep et al, "Magnetic-free non-reciprocity and isolation based on parametrically modulated coupled-resonator loops", http:lldx.doi.orgl10.103Bln phys3134, Nov. 2014, pp. 923-927, vol. 10, No. 12.
Dinesh Bharadia et al, "Full Duplex Radios", SIGCOMM Conference, 2013, pp. 375-386.
Ramez Askar et al, "Active Self-Interference Cancellation Mechanism for Full-Duplex Wireless Transceivers", 2014 9th CROWNCOM Conference, 2014, pp. 539-544.
Ramez Askar et al, "Full-Duplex Wireless Transceiver in Presence of I/Q Mismatches: Experimentation and Estimation Algorithm", IEEE GC 2015 Workshop on Emerging Technologies for SG Wireless Cellular Networks, 2015.
Melissa Duarte et al, "Full-Duplex Wireless Communications Using Off-The-Shelf Radios: Feasibility and First Results", ASILOMAR Conference, 2010, pp. 1558-1562.
Melissa Duarte et al, "Experiment-Driven Characterization of Full-Duplex Wireless Systems", IEEE Transactions on Wireless Communications, Dec. 2012, pp. 4296-4307, vol. 11, No. 12.
Ramez Askar et al, "I/Q Imbalance Calibration for Higher Self-Interference Cancellation Levels in Full-Duplex Wireless Transceivers", 2014 1st International Conference, pp. 92-97.
Dani Korpi et al, "Widely Linear Digital Self-Interference Cancellation in Direct-Conversion Full-Duplex Transceiver", IEEE Journal, Sep. 2014, pp. 1674-1687, vol. 32, No. 9.
Elsayed Ahmed et al, "Self-Interference Cancellation with Nonlinear Distortion Suppression for Full-Duplex Systems", Asilomar Conference, 2013, pp. 1199-1203.
Dani Korpi et al, "Full-Duplex Transceiver System Calculations: Analysis of ADC and Linearity Challenges", IEEE Transactions on Wireless Communications, Jul. 2014, pp. 3821-3836, vol. 13, No. 7.
Lauri Anttila et al, "Cancellation of Power Amplifier Induced Nonlinear Self-Interference in Full-Duplex Transceivers", Asilomar Conference, 2013, pp. 1193-1198.

(56) References Cited

OTHER PUBLICATIONS

Achaleshwar Sahai et al, "Understanding the Impact of Phase Noise on Active Cancellation in Wireless Full-Duplex", ASILOMAR Conference, Nov. 2012, pp. 29-33.

Elsayed Ahmed et al, "Self-Interference Cancellation with Phase Noise Induced ICI Suppression for Full-Duplex Systems", Signal Processing for Communications Symposium, 2013, pp. 3384-3388.

Yingbo Hua et al, "Breaking the Barrier of Transmission Noise in Full-Duplex Radio", IEEE Military Communications Conference, 2013, pp. 1558-1563.

Dinesh Bharadia et al, "Full Duplex Backscatter", 12th ACM Workshop, 2013, pp. 4:1-4:7.

Dinesh Bharadia et al, "Full Duplex MIMO Radios", 11th USENIX Symposium, 2014, pp. 359-372.

Armen Gholian et al, "A Numerical Investigation of All-Analog Radio Self-Interference Cancellation", 2014 IEEE 1Sth International Workshop, 2014, pp. 459-463.

Yingbo Hua et al, "Blind Digital Tuning for Interference Cancellation in Full-Duplex Radio", 48th Asilomar Conference, Nov. 2014, pp. 1691-1695.

Yingbo Hua et al, "Radio self-interferencecancellationbytransmitbeamforming, all-analog cancellation and blind digital tuning", http:llwww.sciencedirect.comlsciencelarticle/pii/50165168414004484, 2015, pp. 322-340, vol. 108.

Joseph G. Mcmichael et al, "Optimal Tuning of Analog Self-Interference Cancellers for Full-Duplex Wireless Communication", 50th Annual Allerton Conference, Oct. 2012, pp. 246-251.

K.E.Kolodziej et al, "Adaptive RF Canceller for Transmit-Receive Isolation Improvement", Radio and Wireless Symposium, Jan. 2014, pp. 172-174.

\* cited by examiner

RADIO FREQUENCY COMMUNICATION AND JAMMING DEVICE AND METHOD FOR PHYSICALLY SECURED FRIENDLY RADIO FREQUENCY COMMUNICATION AND FOR JAMMING HOSTILE RADIO FREQUENCY COMMUNICATION

CROSS-REFERENCE TO RELATED APPLICATIONS

This application is a continuation of copending International Application No. PCT/EP2018/064749, filed Jun. 5, 2018, which is incorporated herein by reference in its entirety, and additionally claims priority from European Applications Nos. 17400029.9, filed Jun. 6, 2017, which is also incorporated herein by reference in its entirety.

The invention relates to physically secured friendly radio frequency communication in combination with jamming of hostile radio frequency communication.

BACKGROUND OF THE INVENTION

For medical applications a so called "shield" device, which operates as a barrier between an implanted medical device and an outside eavesdropper, is presented in reference [1]. The system still uses cryptographic algorithms, which do not fully rely on physical secrecy communication methods.

The authors of reference [2] have studied the physical security of unidirectional link from a source node to a destination node in presence of a passive eavesdropper. The authors do not address the operation or the scheme of the jamming system neither in presence of multiple hostiles (limited to a passive eavesdropper in the paper) nor maintaining a bidirectional physically-secured link between two friendly peers.

The presented work in [3] has considered a single centralized jamming source node, the base station according to paper's authors. The base station as the source of jamming signal relies on its multi-antenna configuration to introduce physical secrecy to two unidirectional links, an uplink and a down-link. The links are not geographically co-located, they are directed for two different friendly terminals. The uplink and the downlink share the same frequency band as the jamming signal, however, the jamming signal is beam formed. The jamming coverage, therefore, is limited to a sub-space of the surrounding environment. The physical secrecy of such approach is affected by the relative location of an eavesdropper to the terminals locations.

Concerning the physical-layer security in relaying scenarios, authors in [4] have studied two cases in the one-way relay scenarios: The two-hop full-duplex operation which is spectral resource saving oriented, and the time-division two-hop associated with jamming in which the physical secrecy is the primary concern. The latter case describes a time consecutive two-hop protocol, wherein in the first hop the relay node protects itself by sending a jamming signal that denies the eavesdropper from decoding the source concurrently transmitted signal. In the second hop, the relay forwards the source signal to its destination node, whereas, the source node is acting as friendly jammer. The mechanism suffers from a discontinuation in the transmission as it relies on dividing the transmission into two consecutive time slots.

SUMMARY

According to an embodiment, a radio frequency communication and jamming device configured for physically secured friendly radio frequency communication and for jamming hostile radio frequency communication may have: an antenna arrangement having a transmission section for transmitting outgoing signals and a receiving section for receiving incoming signals; a receiver device configured for extracting an incoming information signal from the incoming signals received via the receiving section in a receiving frequency band; a jamming generator configured for generating at least one jamming signal for jamming at least one jamming frequency band, wherein the jamming signal is transmitted as one of the outgoing signals via the transmission section, wherein the at least one jamming frequency band includes the receiving frequency band; and a self-interference cancellation device configured for cancelling portions of the at least one jamming signal in the incoming signals received via the receiving section at least in the receiving frequency band.

According to another embodiment, a system for physically secured friendly radio frequency communication and for jamming hostile radio frequency communication may have: a first radio frequency communication and jamming device and a second radio frequency communication and jamming device; wherein each of the first and second radio frequency communication and jamming devices are configured for physically secured friendly radio frequency communication and for jamming hostile radio frequency communication, and may have: an antenna arrangement having a transmission section for transmitting outgoing signals and a receiving section for receiving incoming signals; a receiver device configured for extracting an incoming information signal from the incoming signals received via the receiving section in a receiving frequency band; a jamming generator configured for generating at least one jamming signal for jamming at least one jamming frequency band, wherein the jamming signal is transmitted as one of the outgoing signals via the transmission section, wherein the at least one jamming frequency band includes the receiving frequency band; and a self-interference cancellation device configured for cancelling portions of the at least one jamming signal in the incoming signals received via the receiving section at least in the receiving frequency band, a transmitter device configured for generating at least one outgoing information signal in a transmission frequency band, wherein the outgoing information signal is transmitted as one of the outgoing signals via the transmission section, wherein the transmission frequency band and the receiving frequency band do not overlap; wherein the at least one jamming frequency band excludes the transmission frequency band; wherein the receiving frequency band of the first radio frequency communication and jamming device includes the transmission frequency band of the second radio frequency communication and jamming device; and wherein the receiving frequency band of the second radio frequency communication and jamming device includes the transmission frequency band of the first radio frequency communication and jamming device; wherein the outgoing information signal of the first radio frequency communication and jamming device is the incoming information signal of the second radio frequency communication and jamming device; and wherein the outgoing information signal of the second radio frequency communication and jamming device is the incoming information signal of the first radio frequency communication and jamming device.

According to another embodiment, a method for physically secured friendly radio frequency communication and for jamming hostile radio frequency communication may have the steps of: transmitting outgoing signals by using a transmission section of an antenna arrangement and receiving incoming signals by using a receiving section of the antenna arrangement; extracting an incoming information signal from the incoming signals received via the receiving section in a receiving frequency band by using a receiver device; generating at least one jamming signal for jamming at least one jamming frequency band by using a jamming generator, wherein the jamming signal is transmitted as one of the outgoing signals via the transmission section, wherein the at least one jamming frequency band includes the receiving frequency band; and cancelling portions of the at least one jamming signal in the incoming signals received via the receiving section at least in the receiving frequency band by using a self-interference cancellation device.

According to another embodiment, a method for operating a system for physically secured friendly radio frequency communication and for jamming hostile radio frequency communication, the system having: a first radio frequency communication and jamming device and a second radio frequency communication and jamming device; wherein each of the first and second radio frequency communication and jamming devices are configured for physically secured friendly radio frequency communication and for jamming hostile radio frequency communication, and may have: an antenna arrangement having a transmission section for transmitting outgoing signals and a receiving section for receiving incoming signals; a receiver device configured for extracting an incoming information signal from the incoming signals received via the receiving section in a receiving frequency band; a jamming generator configured for generating at least one jamming signal for jamming at least one jamming frequency band, wherein the jamming signal is transmitted as one of the outgoing signals via the transmission section, wherein the at least one jamming frequency band includes the receiving frequency band; and a self-interference cancellation device configured for cancelling portions of the at least one jamming signal in the incoming signals received via the receiving section at least in the receiving frequency band, a transmitter device configured for generating at least one outgoing information signal in a transmission frequency band, wherein the outgoing information signal is transmitted as one of the outgoing signals via the transmission section, wherein the transmission frequency band and the receiving frequency band do not overlap; wherein the at least one jamming frequency band excludes the transmission frequency band; the method having the steps of: setting the receiving frequency band of the first radio frequency communication and jamming device and the transmission frequency band of the second radio frequency communication and jamming device in such way that the receiving frequency band of the first radio frequency communication and jamming device includes the transmission frequency band of the second radio frequency communication and jamming device; and setting the receiving frequency band of the second radio frequency communication and jamming device and the transmission frequency band of the first radio frequency communication and jamming device in such way that the receiving frequency band of the second radio frequency communication and jamming device includes the transmission frequency band of the first radio frequency communication and jamming device; using the outgoing information signal of the first radio frequency communication and jamming device as the incoming information signal of the second radio frequency communication and jamming device; and using the outgoing information signal of the second radio frequency communication and jamming device as the incoming information signal of the first radio frequency communication and jamming device.

Another embodiment may have a non-transitory digital storage medium having a computer program stored thereon to perform the method for physically secured friendly radio frequency communication and for jamming hostile radio frequency communication, the method having the steps of: transmitting outgoing signals by using a transmission section of an antenna arrangement and receiving incoming signals by using a receiving section of the antenna arrangement; extracting an incoming information signal from the incoming signals received via the receiving section in a receiving frequency band by using a receiver device; generating at least one jamming signal for jamming at least one jamming frequency band by using a jamming generator, wherein the jamming signal is transmitted as one of the outgoing signals via the transmission section, wherein the at least one jamming frequency band includes the receiving frequency band; and cancelling portions of the at least one jamming signal in the incoming signals received via the receiving section at least in the receiving frequency band by using a self-interference cancellation device, when said computer program is run by a computer.

In a first aspect the invention provides a radio frequency communication and jamming device configured for physically secured friendly radio frequency communication and for jamming hostile radio frequency communication, the radio frequency communication and jamming device comprising:

an antenna arrangement having a transmission section for transmitting outgoing signals and a receiving section for receiving incoming signals;

a receiver device configured for extracting an incoming information signal from the incoming signals received via the receiving section of the antenna arrangement in a receiving frequency band;

a jamming generator configured for generating at least one jamming signal for jamming at least one jamming frequency band, wherein the jamming signal is transmitted as one of the outgoing signals via the transmission section, wherein the at least one jamming frequency band includes the receiving frequency band; and a self-interference cancellation device configured for cancelling portions of the at least one jamming signal in the incoming signals received via the receiving section at least in the receiving frequency band.

The term "radio frequency communication" refers to all kinds of communication, such as voice communication or data communication, via air waves. The term "information signal" refers to any meaningful signal. The term "physically secured" refers to that type of communication, which is secured by means at a physical layer of the respective radio frequency communication system. In particular, it refers to radio frequency communication systems in which meaningful transmissions are prevented from being received and decoded by a potential eavesdropper by jamming. Such communication systems provide secure communication without encryption, steganography or other known techniques for securing meaningful transmissions. The term "jamming" refers to actively transmitting radio waves which override the meaningful transmissions at a receiver of the potential eavesdropper.

Self-interference cancellation is a technology that cancels the "unwanted" energy that leaks into a receiver device of the communication device while the communication device is transmitting. As a result of the cancellation, the receiver receives significantly less or no noise from its transmitter, freeing it to cleanly receive external signals. A communication device using self-interference cancellation technology can transmit and receive at the same time on the same frequency. According to the invention, self-interference cancellation is used to enable the receiver device to extract the information signal in presence of the jamming signal, which will be explained in more details below.

Basically, the main idea behind the invention is to provide a distributed, multi-frequency-band jamming mechanism that disrupts (jams) the hostile communications over the jammed frequency bands, while enabling only the friendly devices to communicate over a physically secured (jammed) wireless medium among each other. Furthermore, the smart jamming mechanism also potentially allows eavesdropping on the attempted-to-establish hostile wireless communication links over the jammed bands. Each friendly radio frequency communication and jamming device, which is a part of the smart jamming mesh communication network, jams its surrounding space by transmitting whatever jamming signals over the jamming-targeted frequency bands. It could be multiple scattered bands, one continuous ultra-wide band or even a combination of both. By that, the communication among the hostile communication devices in the jamming coverage area is disrupted as their receivers shall be jammed by means of the transmitted jamming signals. The geographic jammed area is determined in accordance with the transmit power, the number and the location of the radio frequency communication and jamming devices distributed in the jamming network. The invented solution improves these ordinary jamming regimes by offering a method to secure the wireless links among the friendly radio frequency communication and jamming device while keeping the hostile communication devices jammed. This is done by taking advantage of the self-interference cancellation device which allows the friendly radio frequency communication and jamming devices to receive over at least one of the jammed frequency bands. In other words, the radio frequency communication and jamming devices in the mesh network may cooperate together to jam their surrounding space for the hostile communication devices and secure the communication among the friendly radio frequency communication and jamming devices.

The proposed mechanism of the system achieves three major goals:
1. Physically securing the wireless communication links among the friendly radio frequency communication and jamming devices.
2. Jamming the wireless space at one or more frequency bands and, by that, disrupting the communication links among the hostile communication devices.
3. Potentially intercepting and eavesdropping on the attempted-to-transmit signals from the hostile communication devices.

The invention provides a highly secure wireless link among the friendly mesh network devices, while keeping the hostile devices jammed and hence unable to communicate among each other. The jamming as desired functionality is exploited to be as well a physical secrecy providing mechanism for the friendly communication links. In other words, the jamming signal is used as a covering signal to bury the communication links among the friendly radio frequency communication and jamming devices instead of being a disabler (jammer) of friendly communication, while keeping its main purpose as hostile's communication disruption mechanism maintained in operation.

According to an embodiment of the invention the self-interference cancellation device comprises an inserting device for inserting a self-interference cancelation signal into the incoming signals downstream of the receiving section and a self-interference cancelation signal calculating device for calculating the self-interference cancelation signal from the jamming signal. Such a self-interference cancellation approach is also known as self-interference cancellation by signal injection in the radio frequency domain. However, the self-interference cancellation device may be designed according to other self-cancellation approaches or a combination of these approaches, such as attenuating of the self-interference signal in the radio frequency domain, cancellation of the self-interference signal in the analog domain of the receiver device or cancellation of the self-interference signal in the digital domain of the receiver device.

The self-interference cancelation signal may be, for example, inserted into the incoming signals between of the receiving section and the receiver device. In other embodiments, The self-interference cancelation signal may also be inserted into the incoming signals at the receiver device.

The self-interference cancellation device may be designed according to references [5] to [9], although the self-interference cancellation approaches of references [5] to [9] initially were intended for different applications.

According to an embodiment of the invention the radio frequency communication and jamming device further comprises:
a transmitter device configured for generating at least one outgoing information signal in a transmission frequency band, wherein the outgoing information signal is transmitted as one of the outgoing signals via the transmission section, wherein the transmission frequency band and the receiving frequency band do not overlap;
wherein the at least one jamming frequency band excludes the transmission frequency band.

These features allow the radio frequency communication and jamming device not only to receive physically secured incoming information signals but also to transmit outgoing information signals. These outgoing information signals then may be physically secured by the jamming generator of a further radio frequency communication a jamming device according to the invention. By these means a bidirectional physically secured communication may be created.

According to an embodiment of the invention the transmission section comprises a first radiation pattern control unit configured for adapting a radiation pattern for transmitting the outgoing information signal. These features allow directing the outgoing information signal towards the friendly radio frequency communication and jamming device for which it is intended. One advantage of these features is that the physical security may be increased as the information signal covers limited transmission range—due to the fact that only potential eavesdroppers within the transmission range are able to receive the outgoing information signal. The transmission range may be adapted in an azimuthal and/or elevational direction. Another advantage of these features is that the possible distance between the sending radio frequency communication and jamming device and the receiving radio frequency communication and jamming device may be increased without increasing the power of the outgoing information signal. Similarly, the power of the outgoing information signal may be decreased without decreasing the possible distance between the sending radio frequency communication and jamming device and the receiving radio frequency communication and jamming device.

According to an embodiment of the invention the transmission section comprises a second radiation pattern control unit configured for adapting a radiation patterns for transmitting the respective jamming signal.

According to an embodiment of the invention the transmission section comprises a power control unit configured for adapting a power of the jamming signal.

These features allow adapting the coverage of the jamming signal to positions of potential eavesdroppers so that the physical security may be increased.

According to an embodiment of the invention the receiving section comprises a direction estimation unit configured for estimating a direction from which the incoming information signal is arriving.

According to an embodiment of the invention the direction estimation unit is configured for adapting a receiving pattern for receiving the incoming information signal based on the estimated direction.

An advantage of these features is that the possible distance between the sending radio frequency communication and jamming device and the receiving radio frequency communication and jamming device may be increased without increasing the power of the incoming information signal. Similarly, the power of the incoming information signal may be decreased without decreasing the possible distance between the sending radio frequency communication and jamming device and the receiving radio frequency communication and jamming device. The radiation pattern may be adapted in an azimuthal and/or elevational direction.

According to an embodiment of the invention the jamming generator is configured for generating a plurality of jamming signals of the jamming signals for jamming the at least one jamming frequency band, wherein the jamming signals of the plurality of jamming signals have different characteristics, wherein the transmission section comprises a plurality of transmission channels, wherein each jamming signal of the plurality of jamming signals is transmitted over one transmission channel of the plurality of transmission channels, wherein the transmission channels of the plurality of transmission channels have different radiation patterns for transmitting the respective jamming signal.

These features improve the physical security of the friendly communication links in presence of smart hostile communication devices which are equipped with multi-antenna systems. Such smart hostiles are assumed to be capable of listening to the propagated signals from different directions discriminately.

These features of dividing the space into multiple sectors and jam each of the sectors using different jamming signal. In an exemplary implementation of the multi-sector enhanced smart jammers, the friendly radio frequency communication and jamming device divides the two-dimensional azimuthal space into four symmetric sectors and jams them with different signals. These features allow deceiving smart hostile communication devices that might have an advanced technique to extract jamming signals and to cancel them. The reason for this is that the hostile communication device will most likely receive the jamming signal, which is intended for the sector in which the hostile communication device is located, and another jamming signal of the jamming signals, which is intended for other sector but reflected at natural or man-made obstacles so that it reaches the hostile communication device. Receiving two different jamming signals at the same time from different directions makes it almost impossible to cancel the respective jamming signals and hence extract the information signal.

According to an embodiment of the invention the receiver device is configured for extracting the incoming information signal and a further incoming information signal from the incoming signals received via the receiving section, wherein the incoming signal is in the receiving frequency band, wherein the further incoming signal is in a further receiving frequency band, wherein the at least one jamming frequency band includes the further receiving frequency band;

wherein the transmitter device is configured for generating the outgoing information signal and a further outgoing information signal, wherein the further outgoing information signal is transmitted via the transmission section in a further transmission frequency band, which is not overlapping the frequency band of the outgoing information signal; and wherein the further transmission frequency band and the further receiving frequency band do not overlap.

These features allow the radio frequency communication and jamming device to establish two independent physically secured bidirectional communication links with two further radio frequency communication and jamming devices.

According to an embodiment of the invention the receiving section is configured for receiving the incoming information signal and a further incoming information signal of the incoming signals, which are in the same receiving frequency band;

wherein the receiving section comprises a direction estimation unit configured for estimating a direction of origin for both of the incoming information signal and the further information signal;

wherein the receiver device is configured for extracting the incoming information signal and a further incoming information signal from the incoming signals received via the receiving section using the estimated directions of origin; and wherein the transmitter device is configured for generating the outgoing information signal and a further outgoing information signal, wherein the further outgoing information signal is transmitted via the transmission section in the transmission frequency band.

These features allow the radio frequency communication and jamming device to establish two independent physically secured bidirectional communication links with two further radio frequency communication and jamming devices within the same receiving frequency band.

In a further aspect the invention provides a system for physically secured friendly radio frequency communication and for jamming hostile radio frequency communication, the system comprising:

a first radio frequency communication and jamming device according to one of the claims 3 to 9; and a second radio frequency communication and jamming device according to one of the claims 3 to 9;

wherein the receiving frequency band of the first radio frequency communication and jamming device includes the transmission frequency band of the second radio frequency communication and jamming device;

wherein the receiving frequency band of the second radio frequency communication and jamming device includes the transmission frequency band of the first radio frequency communication and jamming device wherein the outgoing information signal of the first radio frequency communication and jamming device is the incoming information signal of the second radio frequency communication and jamming device;

wherein the outgoing information signal of the first radio frequency communication and jamming device is the incoming information signal of the second radio frequency communication and jamming device; and wherein the outgoing information signal of the second radio frequency communication and jamming device is the incoming information signal of the first radio frequency communication and jamming device.

According to an embodiment of the invention the system further comprises:

a third radio frequency communication and jamming device according to one of the claims 3 to 9;

wherein the second radio frequency communication and jamming device is configured according to claim 11 wherein the receiving frequency band of the third radio frequency communication and jamming device includes the further transmission frequency band of the second radio frequency communication and jamming device;

wherein the further receiving frequency band of the second radio frequency communication and jamming device includes the transmission frequency band of the third radio frequency communication and jamming device;

wherein the first radio frequency communication and jamming device and the third radio frequency communication and jamming device are located in reach of the second radio frequency communication and jamming device;

wherein the first radio frequency communication and jamming device and the third radio frequency communication and jamming device are located mutually out of reach;

wherein the further outgoing information signal of the second radio frequency communication and jamming device is the incoming information signal of the third radio frequency communication and jamming device; and wherein the outgoing information signal of the third radio frequency communication and jamming device is the further incoming information signal of the second radio frequency communication and jamming device.

According to an embodiment of the invention the system further comprises:

a third radio frequency communication and jamming device according to one of the claims 3 to 9;

wherein the receiving frequency band of the third radio frequency communication and jamming device includes the transmission frequency band of the second radio frequency communication and jamming device;

wherein the receiving frequency band of the second radio frequency communication and jamming device includes the transmission frequency band of the third radio frequency communication and jamming device;

wherein the first radio frequency communication and jamming device and the third radio frequency communication and jamming device are located in reach of the jamming device of the second radio frequency communication and jamming device;

wherein the first radio frequency communication and jamming device and the third radio frequency communication and jamming device are located mutually out of reach;

wherein the transmission frequency band of the first frequency communication and jamming device is equal to the transmission frequency band of the first frequency communication and jamming device;

wherein the second radio frequency communication and jamming device is configured according to claim 11;

wherein the further outgoing information signal of the second radio frequency communication and jamming device is the incoming information signal of the third radio frequency communication and jamming device; and wherein the outgoing information signal of the third radio frequency communication and jamming device is the further incoming information signal of the second radio frequency communication and jamming device.

In a further aspect the invention provides a method for physically secured friendly radio frequency communication and for jamming hostile radio frequency communication, the method comprising the steps:

transmitting outgoing signals by using a transmission section of an antenna arrangement and receiving incoming signals by using a receiving section of the antenna arrangement;

extracting an incoming information signal from the incoming signals received via the receiving section in a receiving frequency band by using a receiver device;

generating at least one jamming signal for jamming at least one jamming frequency band by using a jamming generator, wherein the jamming signal is transmitted as one of the outgoing signals via the transmission section, wherein the at least one jamming frequency band includes the receiving frequency band; and cancelling portions of the at least one jamming signal in the incoming signals received via the receiving section at least in the receiving frequency band by using a self-interference cancellation device.

In a further aspect the invention provides a method for operating a system for physically secured friendly radio frequency communication and for jamming hostile radio frequency communication, the system comprising:

a first radio frequency communication and jamming device according to one of the claims 3 to 11, and a second radio frequency communication and jamming device according to one of the claims 3 to 11;

wherein the method comprises the steps of:

setting the receiving frequency band of the first radio frequency communication and jamming device and the transmission frequency band of the second radio frequency communication and jamming device in such way that the receiving frequency band of the first radio frequency communication and jamming device includes the transmission frequency band of the second radio frequency communication and jamming device; and setting the receiving frequency band of the second radio frequency communication and jamming device and the transmission frequency band of the first radio frequency communication and jamming device in such way that the receiving frequency band of the second radio frequency communication and jamming device includes the transmission frequency band of the first radio frequency communication and jamming device;

using the outgoing information signal of the first radio frequency communication and jamming device as the incoming information signal of the second radio frequency communication and jamming device; and using the outgoing information signal of the second radio frequency communication and jamming device as the incoming information signal of the first radio frequency communication and jamming device.

In a further aspect the invention provides a computer program for, when running on a processor, executing the method according to the invention.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
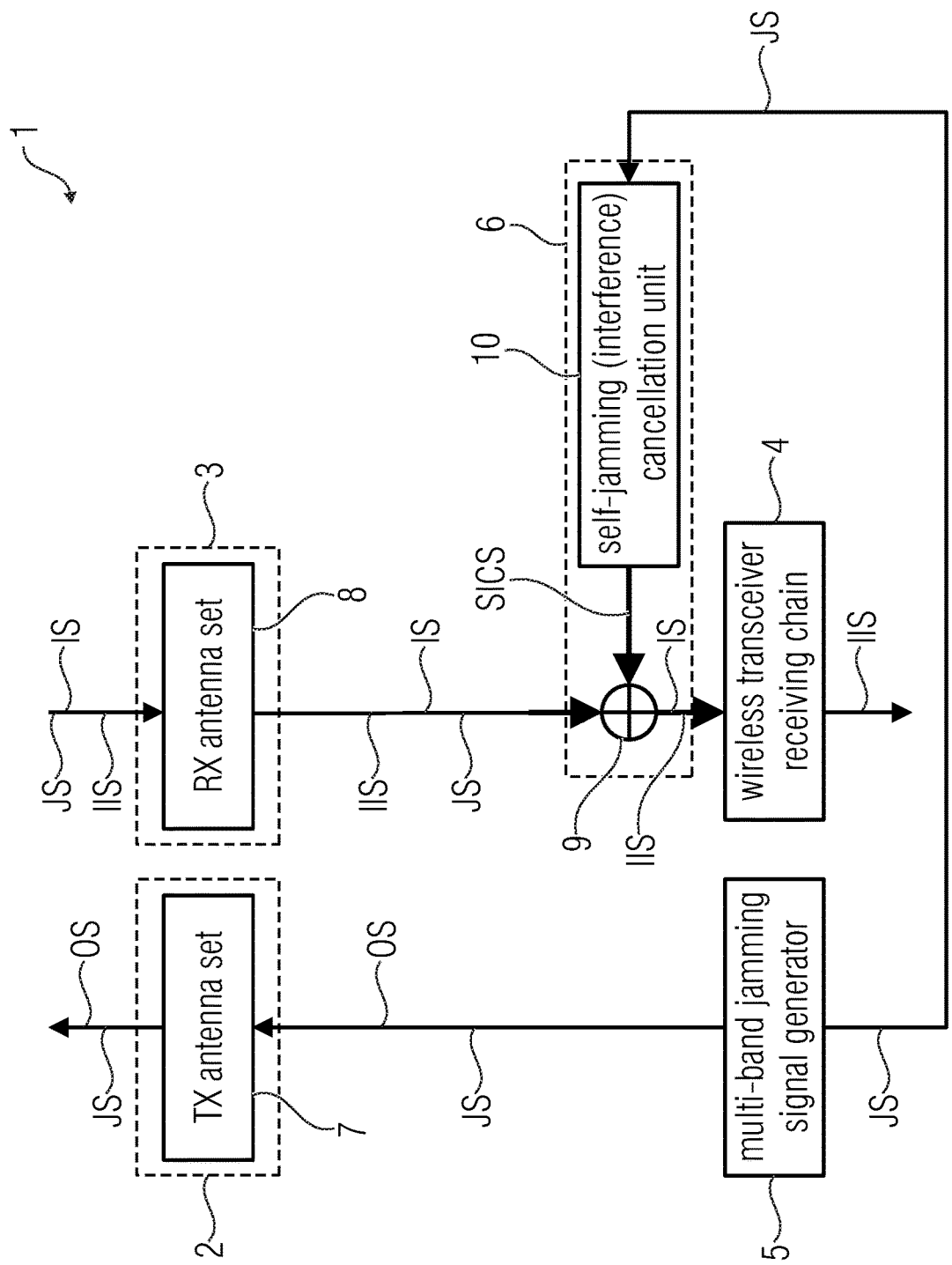
FIG. 1 illustrates a first embodiment of a radio frequency communication and jamming device according to the invention in a schematic view.

Equal or equivalent elements or elements with equal or equivalent functionality are denoted in the following description by equal or equivalent reference numerals.

In the following description, a plurality of details is set forth to provide a more thorough explanation of embodiments of the present disclosure. However, it will be apparent to those skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

FIG. 1 illustrates a first embodiment of a radio frequency communication and jamming device 1 according to the invention in a schematic view. The radio frequency communication and jamming device 1 is configured for physically secured friendly radio frequency communication and for jamming hostile radio frequency communication. The radio frequency communication and jamming device 1 comprises:

an antenna arrangement 2, 3 having a transmission section 2 for transmitting outgoing signals OS and a receiving section 3 for receiving incoming signals IS;

a receiver device 4 configured for extracting an incoming information signal IIS from the incoming signals IS received via the receiving section 3 in a receiving frequency band R;

a jamming generator 5 configured for generating at least one jamming signal JS for jamming at least one jamming frequency band J, wherein the jamming signal JS is transmitted as one of the outgoing signals OS via the transmission section 2, wherein the at least one jamming frequency band J includes the receiving frequency band R; and a self-interference cancellation device 6 configured for cancelling portions of the at least one jamming signal JS in the incoming signals IS received via the receiving section 3 at least in the receiving frequency band R.

The transmission section 2 comprises a transmission antenna set 7 which comprises one or more transmission antennas. The receiving section 3 comprises receiving antenna set 8 which comprises one or more receiving antennas.

According to an embodiment of the invention the self-interference cancellation device 1 comprises an inserting device 9 for inserting a self-interference cancelation signal SICS into the incoming signals IS downstream of the receiving section 3 and a self-interference cancelation signal calculating device 10 for calculating the self-interference cancelation signal SICS from the jamming signal JS.

In another aspect the invention provides a method for physically secured friendly radio frequency communication and for jamming hostile radio frequency communication, the method comprising the steps:

transmitting outgoing signals OS by using a transmission section 2 of an antenna arrangement 2, 3 and receiving incoming signals IS by using a receiving section 3 of the antenna arrangement 2, 3;

extracting an incoming information signal IIS from the incoming signals IS received via the receiving section 3 in a receiving frequency band by using a receiver device 4;

generating at least one jamming signal JS for jamming at least one jamming frequency band by using a jamming generator 5, wherein the jamming signal JS is transmitted as one of the outgoing signals OS via the transmission section 2, wherein the at least one jamming frequency band includes the receiving frequency band; and cancelling portions of the at least one jamming signal JS in the incoming signals IS received via the receiving section 3 at least in the receiving frequency band by using a self-interference cancellation device 6.

In another aspect the invention provides a computer program for, when running on a processor, executing the method described above.

Figure 2:
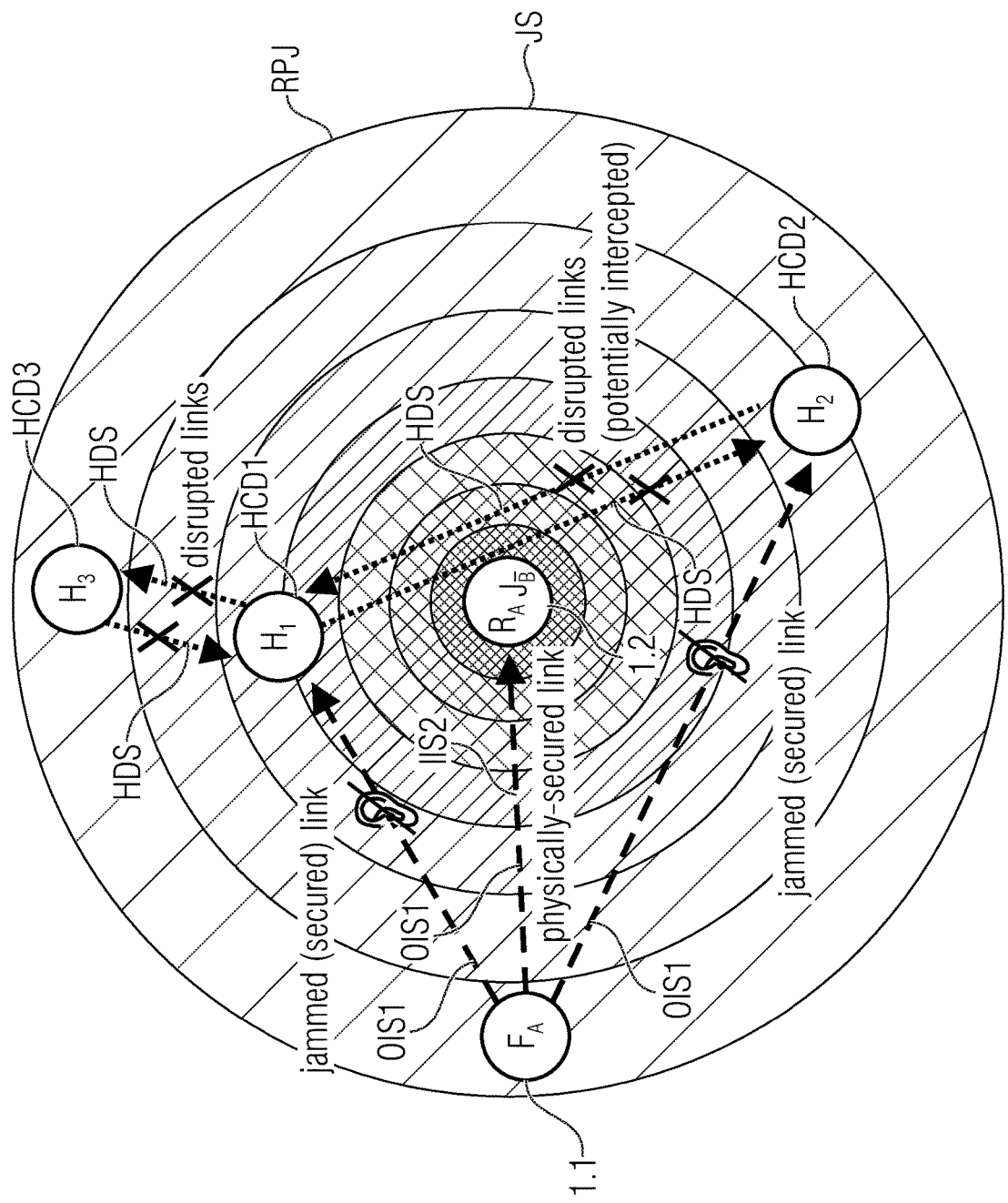
FIG. 2 illustrates functionalities of some embodiments of a radio frequency communication and jamming device according to the invention in an exemplary environment in a schematic view.

FIG. 2 illustrates functionalities of some embodiments of radio frequency communication and jamming devices 1.1 and 1.2 according to the invention in an exemplary environment in a schematic view.

FIG. 2 provides an illustration of the invented jamming mechanism which is shown in a homogenous and obstacle-free environment, wherein a unidirectional physically secured link between the friendly radio frequency communication and jamming device 1.1 and the friendly radio frequency communication and jamming device 1.2 is illustrated. The disruptions or even the potential interceptions of the hostile data signals HDS between the hostile communication devices HCD1, HCD2 and HCD3 are also shown. The radiation pattern RPJ for the jamming signal is omnidirectional in the embodiment of FIG. 2.

FIG. 2 shows two friendly radio frequency communication and jamming devices 1.1 and 1.2, which belong to the same friendly mesh network, having established a unidirectional physically-secured wireless link, whereas the hostile communication devices HCD1, HCD2 and HCD3 in their surrounding are jammed at jamming frequency band $J\overline{B}$. The unidirectional link between two radio frequency communication and jamming devices 1.1 and 1.2 is physically secured by the jamming signal JS transmitted by the radio frequency communication and jamming device 1.2, which is also that the dedicated destination for the outgoing information signal OIS1 sent by the radio frequency communication and jamming device 1.1.

The radio frequency communication and jamming device 1.2 jams its surrounding environment by sending multi-band jamming signals JS covering the jamming frequency band J $\overline{B}$, while its neighboring radio frequency communication and jamming device 1.1 transmits an outgoing information signal OIS1 in the transmission band FA, which lies within the jamming frequency band $\overline{JB}$. Then the outgoing information signal OIS1 is received by the radio frequency communication and jamming device 1.2 as the incoming information signal IIS2. In fact, the jamming signal JS at the radio frequency communication and jamming device 1.2 can be treated as a self-interference signal. Therefore, it can be completely or partially cancelled by taking advantage of a self-interference cancellation mechanism such as described in documents [5] to [9]. The receiving radio frequency communication and jamming device 1.2 cancels the jamming signal JS in the receiving band RA in order to be able to receive and to extract the incoming information signal IIS2 in the jammed environment. In this way, the receiving radio frequency communication and jamming device 1.2 is the only device capable of decoding the outgoing information signal OIS1 as it is the only device in the network which has a perfect knowledge of the jamming signal JS. This knowledge combined with the self-interference cancellation device 6 allows the receiving radio frequency communication and jamming device 1.2 to cancel the jamming signal JS within the receiving frequency band RA, and accordingly enables its receiver device 4 to receive the outgoing information signal OIS1 as the incoming information signal IIS 2 within jamming frequency band $\overline{JB}$. For the hostile communication devices HCD1, HCD2 and HCD3 the transmission frequency band FA along with the rest of jammed frequency band $\overline{JB}$ are disrupted frequencies, so that establishing or maintaining a communication over of jammed frequency band $\overline{JB}$ is not possible.

Finally, to summarize the results of the entire mechanism, the friendly transmitting node 1.1 sustains a unidirectional physically-secured wireless link to the friendly receiving node 1.2. The jammer node 1.2 operates as multi-frequency band jammer that prevents the hostile nodes HCD1, HCD2 and HCD3 in its surrounding geographic area to exchange information over the jammed frequency wireless links and, furthermore, physically secures the friendly communication destined to it.

The explained example introduces the friendly jamming node 1.2 and the friendly source of communication 1.1 as two separate entities. However, in actual regimes they are combined in one joint entity. Thus, each of the friendly nodes 1.1 and 1.2 may be a multi-band jamming source, a source of meaningful transmission data links, and a destination for a meaningful transmission from its neigh boring node(s). By that, physically-secured bidirectional links between two adjacent nodes may be sustained over two different transmission frequency bands.

Figure 3:
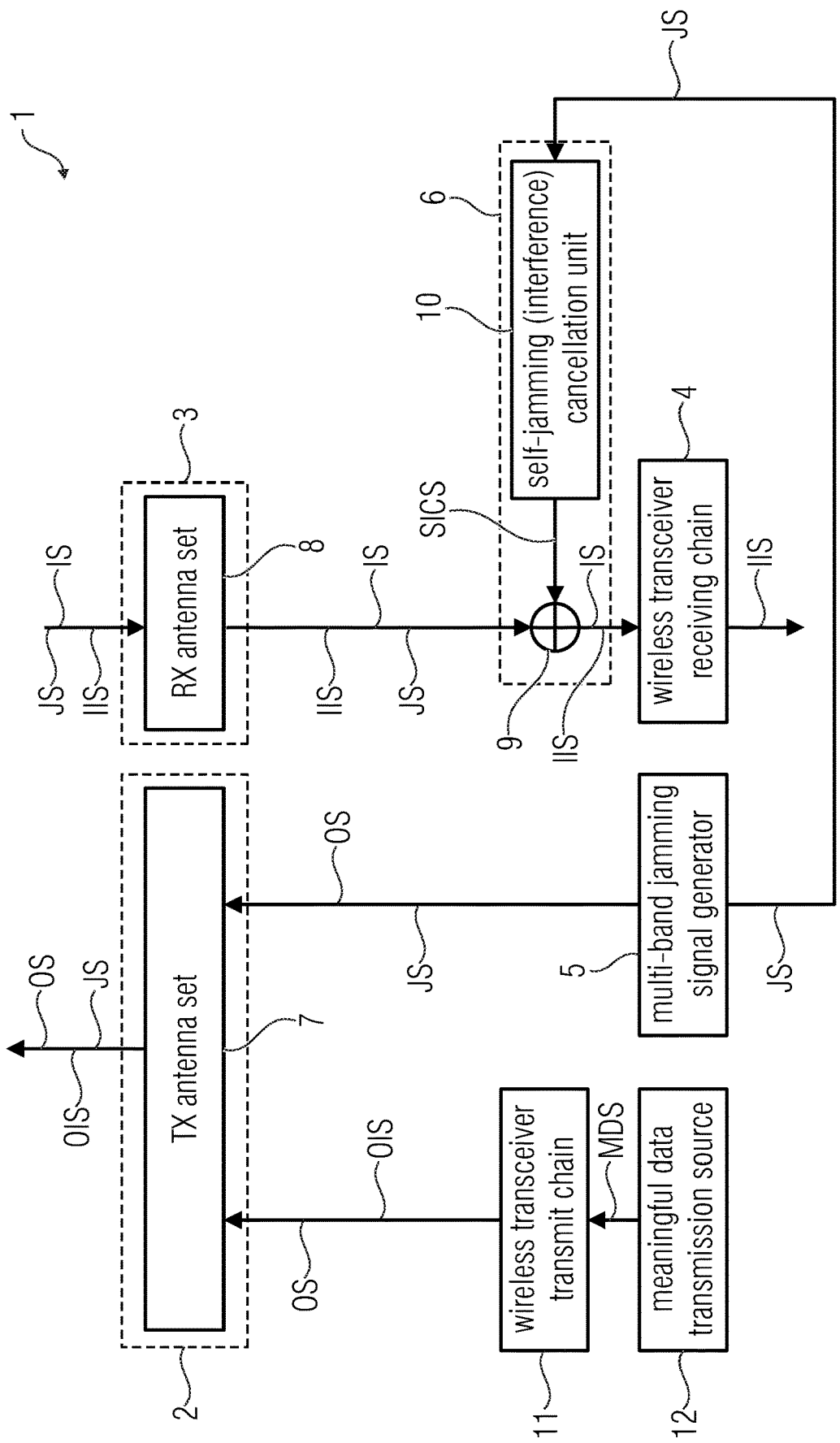
FIG. 3 illustrates a second embodiment of a radio frequency communication and jamming device according to the invention in a schematic view.

FIG. 3 illustrates a second embodiment of a radio frequency communication and jamming device 1 according to the invention in a schematic view. The second embodiment is based on the first embodiment so that the differences with respect to the first embodiment are explained.

According to an embodiment of the invention the radio frequency communication and jamming device 1 further comprises:

a transmitter device 11 configured for generating at least one outgoing information signal OIS in a transmission frequency band F, wherein the outgoing information signal OIS is transmitted as one of the outgoing signals OS via the transmission section 2, wherein the transmission frequency band F and the receiving frequency band R do not overlap;

wherein the at least one jamming frequency band J excludes the transmission frequency band F.

Figure 4:
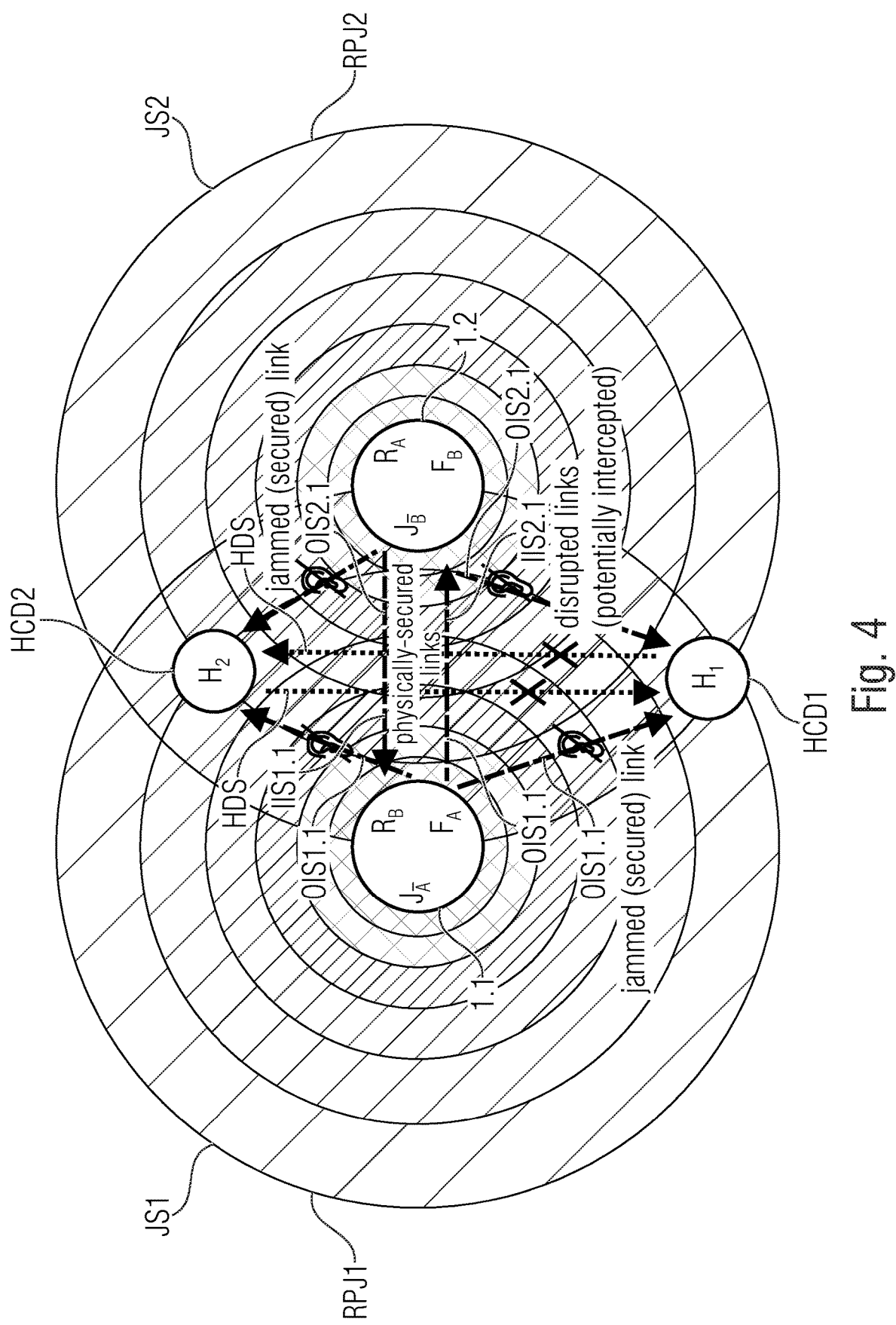
FIG. 4 illustrates functionalities of some embodiments of a radio frequency communication and jamming devices an exemplary system comprising two radio frequency communication and jamming devices according to the invention in an exemplary environment in a schematic view.

FIG. 4 illustrates functionalities of some embodiments of a radio frequency communication and jamming devices 1.1 and 1.2 and an exemplary system comprising two radio frequency communication and jamming devices 1.1 and 1.2 according to the invention in an exemplary environment in a schematic view.

The system for physically secured friendly radio frequency communication and for jamming hostile radio frequency communication comprises:

a first radio frequency communication and jamming device 1.1 being configured for physically secured friendly radio frequency communication and for jamming hostile radio frequency communication, wherein the first radio frequency communication and jamming device 1.1 comprises: an antenna arrangement 2, 3 having a transmission section 2 for transmitting outgoing signals OS and a receiving section 3 for receiving incoming signals IS, a receiver device 4 configured for extracting an incoming information signal IIS1.1 from the incoming signals IS received via the receiving section 3 in a receiving frequency band RB, a jamming generator 5 configured for generating at least one jamming signal JS1 for jamming at least one jamming frequency band $\overline{JA}$, wherein the jamming signal JS1 is transmitted as one of the outgoing signals OS via the transmission section 2, wherein the at least one jamming frequency band $\overline{JA}$ includes the receiving frequency band RB, a self-interference cancellation device 6 configured for cancelling portions of the at least one jamming signal JS1 in the incoming signals IS received via the receiving section 3 at least in the receiving frequency band RB, and a transmitter device 11 configured for generating at least one outgoing information signal OIS1.1 in a transmission frequency band FA, wherein the outgoing information signal OIS1.1 is transmitted as one of the outgoing signals OS via the transmission section 2, wherein the transmission frequency band FA and the receiving frequency band RB do not overlap, wherein the at least one jamming frequency band J $\overline{A}$ excludes the transmission frequency band FA;

and a second radio frequency communication and jamming device 1.2 being configured for physically secured friendly radio frequency communication and for jamming hostile radio frequency communication, wherein the second radio frequency communication and jamming device 1.2 comprises: an antenna arrangement 2, 3 having a transmission section 2 for transmitting outgoing signals OS and a receiving section 3 for receiving incoming signals IS, a receiver device 4 configured for extracting an incoming information signal IIS2.1 from the incoming signals IS received via the receiving section 3 in a receiving frequency band RA, a jamming generator 5 configured for generating at least one jamming signal JS2 for jamming at least one jamming frequency band $\overline{JB}$, wherein the jamming signal JS2 is transmitted as one of the outgoing signals OS via the transmission section 2, wherein the at least one jamming frequency band $\overline{JB}$ includes the receiving frequency band RA, a self-interference cancellation device 6 configured for cancelling portions of the at least one jamming signal JS2 in the incoming signals IS received via the receiving section 3 at least in the receiving frequency band RA, and a transmitter device 11 configured for generating at least one outgoing information signal OIS2.1 in a transmission frequency band FB, wherein the outgoing information signal OIS2.1 is transmitted as one of the outgoing signals OS via the transmission section 2, wherein the transmission frequency band FB and the receiving frequency band RA do not overlap, wherein the at least one jamming frequency band J$\overline{B}$ excludes the transmission frequency band FB;

wherein the receiving frequency band RB of the first radio frequency communication and jamming device 1.1 includes the transmission frequency band FB of the second radio frequency communication and jamming device 1.2; and wherein the receiving frequency band RA of the second radio frequency communication and jamming device 1.2 includes the transmission frequency band FA of the first radio frequency communication and jamming device 1.1;

wherein the outgoing information signal OIS1.1 of the first radio frequency communication and jamming device 1.1 is the incoming information signal IIS2.1 of the second radio frequency communication and jamming device 1.2; and wherein the outgoing information signal OIS2.1 of the second radio frequency communication and jamming device 1.2 is the incoming information signal IIS1.1 of the first radio frequency communication and jamming device 1.1.

FIG. 4 illustrates the mechanism considering a scenario comprising two friendly nodes 1.1 and 1.2 being capable of jamming. Recall from the formerly elaborated example, each node 1.1 and 1.2 may act as a multiband jammer except for the transmitting band FA (for node 1.1) or FB (for node 1.2) in order to avoid jamming the destination node 1.1 or 1.2. The transmitting bands FA of node 1.1 is kept jammed by the jamming signal JS2 as the transmitting band FA of node 1.1 is included in the jamming band J$\overline{B}$ of note 1.2 and the transmitting band FB off node 1.2 is kept jammed (physically-secured) by the jamming signal JS1 as the transmitting band FB off node 1.2 is included in the jamming band J$\overline{A}$ of node 1.1. A bidirectional secure wireless link is maintained between the friendly node 1.1 and the friendly node 1.2 over the transmission frequency bands FA and FB, respectively. The node 1.1 jams a subset J$\overline{A}$ whereas the node 1.2 jams a complement subset J$\overline{B}$ so that the overall jammed frequency band is J$\overline{A}\cup$J$\overline{B}$, wherein FA$\notin$J$\overline{A}$, FB$\in$J$\overline{A}$ and wherein FB$\in$J$\overline{B}$, FB$\notin$J$\overline{B}$.

Another functionally of the invention is the possibility of intercepting the hostile attempt-to-establish links. This can be done in a similar manner as it is accomplished for the physical secrecy of the friendly links. In other words, the friendly jamming nodes 1.1 and 1.2 suppress their jamming (self-interference) signals over the hostile communication frequency bands Thereby they would be able to eavesdrop on the hostile communications.

In a further aspect the invention provides a method for operating a system for physically secured friendly radio frequency communication and for jamming hostile radio frequency communication, the system comprising:

a first radio frequency communication and jamming device 1.1 according to one of the claims 3 to 11; and a second radio frequency communication and jamming device 1.2 according to one of the claims 3 to 11;

wherein the method comprises the steps of:

setting the receiving frequency band RB of the first radio frequency communication and jamming device 1.1 and the transmission frequency band FB of the second radio frequency communication and jamming device 1.2 in such way that the receiving frequency band RB of the first radio frequency communication and jamming device 1.1 includes the transmission frequency band FB of the second radio frequency communication and jamming device 1.2; and setting the receiving frequency band RA of the second radio frequency communication and jamming device 1.2 and the transmission frequency band FA of the first radio frequency communication and jamming device 1.1 in such way that the receiving frequency band RA of the second radio frequency communication and jamming device 1.2 includes the transmission frequency band FA of the first radio frequency communication and jamming device 1.1;

using the outgoing information signal OIS1.1 of the first radio frequency communication and jamming device 1.1 as the incoming information signal IIS2.1 of the second radio frequency communication and jamming device 1.2; and using the outgoing information signal OIS2.1 of the second radio frequency communication and jamming device 1.2 as the incoming information signal IIS1.1 of the first radio frequency communication and jamming device 1.1.

Figure 5:
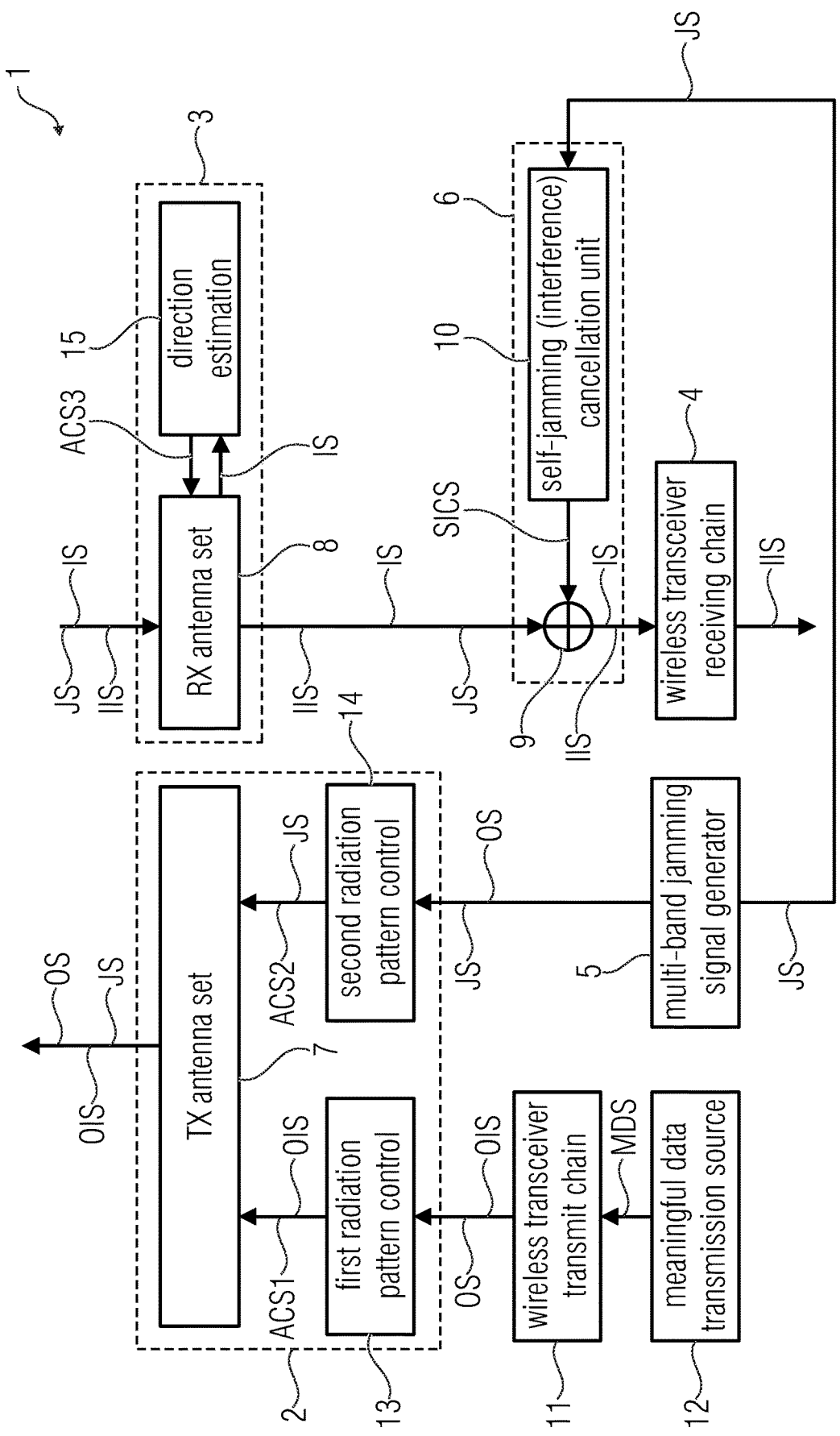
FIG. 5 illustrates a third embodiment of radio frequency communication and jamming device according to the invention in a schematic view.

FIG. 5 illustrates a third embodiment of radio frequency communication and jamming device 1 according to the invention in a schematic view.

According to an embodiment of the invention the transmission section 2 comprises a first radiation pattern control unit 13 configured for adapting a radiation pattern RPO for transmitting the outgoing information signal OIS.

According to an embodiment of the invention the transmission section 2 comprises a second radiation pattern control unit 14 configured for adapting a radiation pattern RPJ for transmitting the jamming signal JS.

According to an embodiment of the invention the transmission section 2 comprises a power control unit (not shown) configured for adapting a power of the jamming signal JS.

According to an embodiment of the invention the receiving section 3 comprises a direction estimation unit 15 configured for estimating a direction from which the incoming information signal IIS is arriving.

According to an embodiment of the invention the direction estimation unit 15 is configured for adapting a receiving pattern for receiving the incoming information signal IIS based on the estimated direction.

Figure 6:
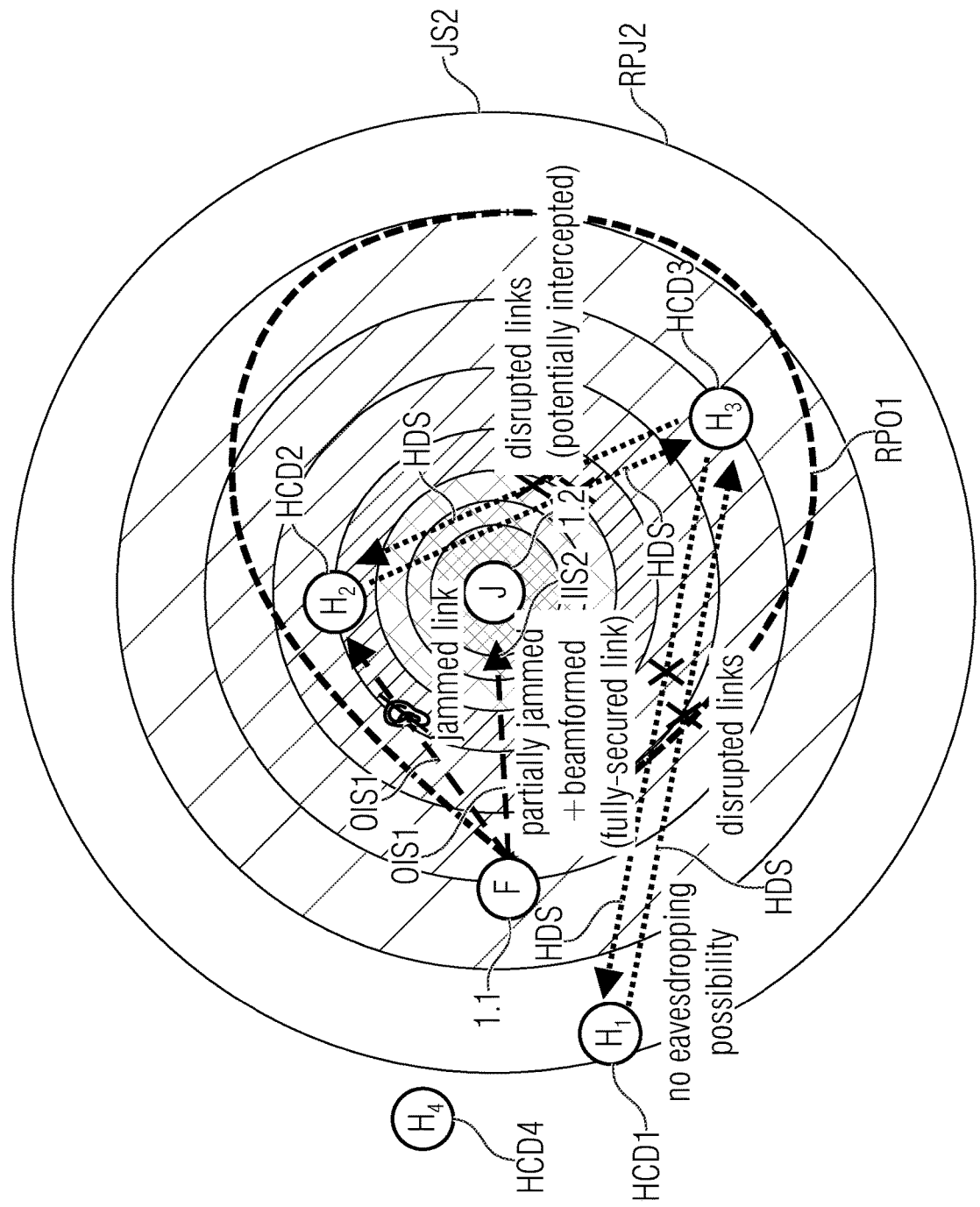
FIG. 6 illustrates functionalities of some embodiments of a radio frequency communication and jamming device according to the invention in an exemplary environment in a schematic view.

FIG. 6 illustrates functionalities of some embodiments of radio frequency communication and jamming devices 1.1 and 1.2 according to the invention in an exemplary environment in a schematic view. The radiation pattern RPO1 for transmitting the outgoing information signal OIS1 of friendly node 1.1 is adapted in such way that the transmission beam RPO1 is fully overlapped by the jamming radiation pattern RPJ2 of friendly node 1.2. As a result, hostile communication device HCD4 is not capable of receiving the outgoing information signal OIS1 although it is located outside of the jamming radiation pattern RPJ2. Hence, with the aid of pattern-forming techniques (beam-forming techniques) the physically-security of the wireless communication links can be augmented in order to meet higher risk scenarios that might be encounter in real-world implementations. Some sort of combination of both techniques, i.e., the increment of the jamming power and beamforming, could be also used based on the needed security standards.

The transmission beam RPO1 can be adaptively steered to maintain its up-to-date directivity toward its desirable destination. This would be especially useful in the moving node scenarios, such as moving convoys. Basically, the entire smart jamming system has to keep the information signal transmission coverage RPO1 as much as possible overlapped with the jamming covered area RPJ2 by the other friendly nodes. Therefore, the invented jamming system would benefit from being aware of its surrounding environment and the status of the active friendly nodes in the jammed or physically-secured network.

Figure 7:
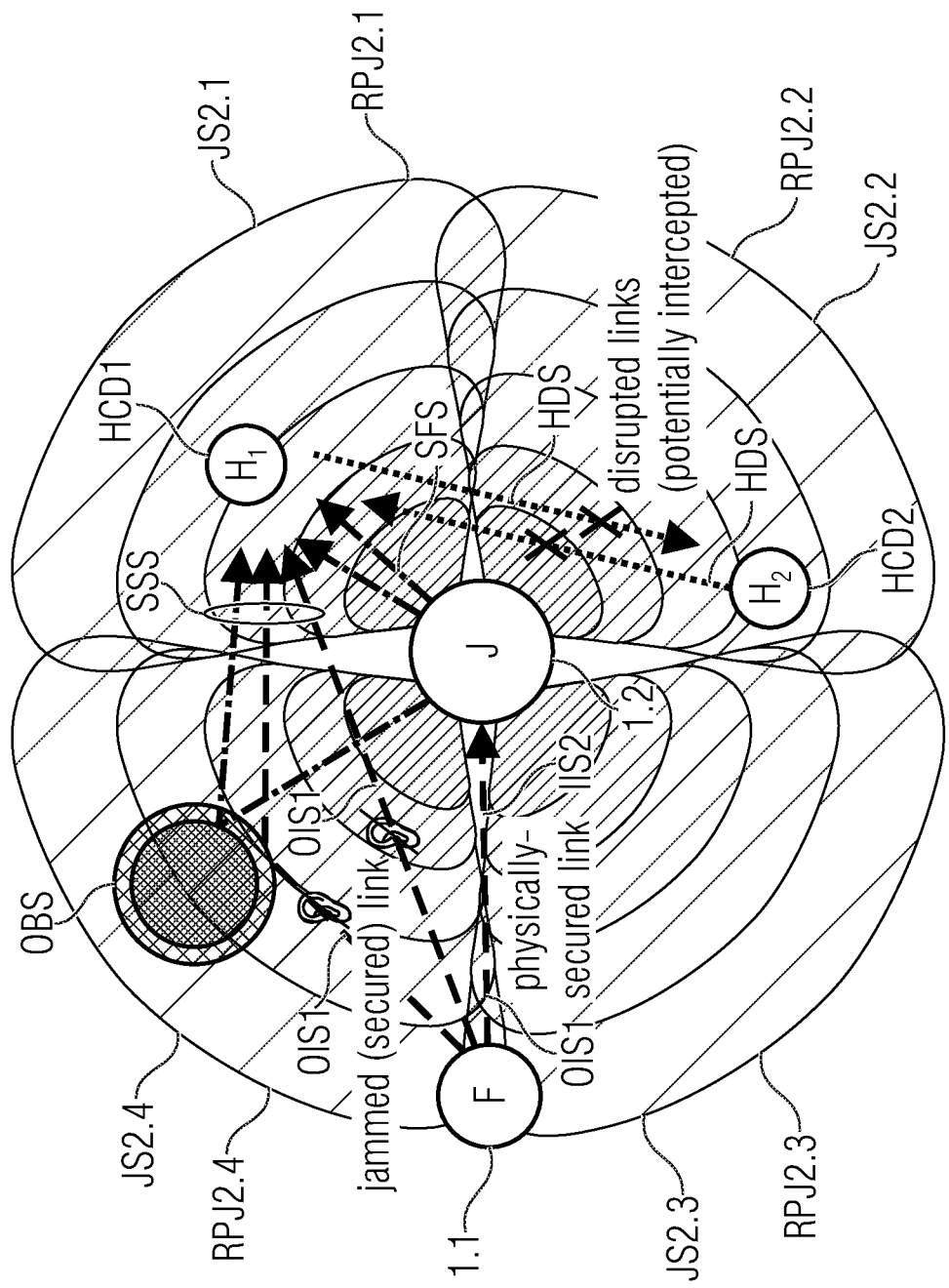
FIG. 7 illustrates functionalities of some embodiments of a radio frequency communication and jamming device according to the invention in an exemplary environment in a schematic view.

FIG. 7 illustrates functionalities of some embodiments of radio frequency communication and jamming devices 1.1 and 1.2 according to the invention in an exemplary environment in a schematic view.

According to an embodiment of the invention the jamming generator 5 is configured for generating a plurality of jamming signals JS2.1, JS2.2, JS2.3, JS2.4 of the jamming signals JS for jamming the at least one jamming frequency band J, wherein of jamming signals JS2.1, JS2.2, JS2.3, JS2.4 of the plurality of jamming signals JS2.1, JS2.2, JS2.3, JS2.4 have different characteristics, wherein the transmission section 2 comprises a plurality of transmission channels, wherein each jamming signal JS2.1, JS2.2, JS2.3, JS2.4 of the plurality of jamming signals JS2.1, JS2.2, JS2.3, JS2.4 is transmitted over one transmission channel of the plurality of transmission channels, wherein the transmission channels of the plurality of transmission channels have different radiation patterns RPJ2.1, RPJ2.2, RPJ2.3, RPJ2.4 for transmitting the respective jamming signal JS2.1, JS2.2, JS2.3, JS2.4.

In a scenario, where a hostile node which is equipped with a multi-antenna system, is trying to eavesdrop on the friendly physically-secured links, the hostile node might employ its multiple antenna system to capture only the jamming signal by sectorizing the space and by listening to a signal from an angularly narrowed direction. FIG. 7 shows an example of a hostile node HCD1 equipped with an antenna system that is capable of separating (sectorizing) the space angularly to four sectors. The hostile node HCD1 may isolate an estimation of the jamming signal JS2.1 by capturing only the direct incident wave from the friendly radio frequency communication and jamming device 1.2 without capturing the meaningful transmission signal OIS1 from the friendly radio frequency communication and jamming device 1.1. This knowledge of the jamming signal JS2.1 could then be utilized at the hostile communication device HCD1 to cancel out the jamming signal JS2.1 from a combination of the jamming signal JSP2.1 and the meaningful transmission signal OIS1 being estimated by means of different antenna(s) in order to obtain the meaningful transmission signal OIS1.

However, the use of a plurality of jamming signals JS2.1, JS2.2, JS2.3, JS2.4 of the jamming signals JS prevents such a derivation of the outgoing information signal OIS1. The multi-sector friendly jammer 1.2, as shown in FIG. 6, transmits four different jamming signals JS2.1, JS2.2, JS2.3, JS2.4 oriented into four different directions. The entire surrounding space is accordingly jammed and virtually divided into four jammed sectors. Four jamming sectors are considered for giving an example, however, any number of sectors can be considered for the jamming system without any upper boundary limitations.

The hostile listener HCD1 may try to obtain a separated estimation of the jamming signal JS2.1. Another simultaneous reception is assumed to be made by the hostile listener HCD1 to capture a signal that contains the jamming signal JS2.1 and the friendly outgoing information signal OIS1 in combination. Then, the hostile listener HCD1 may try to utilize the knowledge of the jamming signal JS2.1 to filter out the jamming signal JS2.1 from the combined signal. This method would be effective considering an omni-directional friendly jammer in which the jamming signal JS2.1 is the same for each captured signal by the hostile eavesdropper.

However, having the friendly jammer 1.2 sending multiple jamming signals JS2.1, JS2.2, JS2.3, JS2.4 to different spatial location may deny the hostile eavesdropper from extracting the meaningful information signal OIS1 as the assumed signals captured by hostile listener HCD1 would be containing two different jamming signals JS2.1 and JS2.4, wherein the jamming signal JS2.1 is a jamming signal JS2.1, which is designated for the sector in which the hostile listener HCD1 is located, and wherein the jamming signal JS2.4 is a jamming signal JS2.4, which is designated for a sector in which the hostile listener HCD1 is not located and which is received by the hostile listener HCD1 after a reflection at an obstacle OBS. The hostile listener HCD1 cannot use the knowledge of the jamming signal JS2.1 from the first estimation to subtract (cancel) it from the combined captured estimation. The friendly jammers 1.2 could also rotate or interchange these beam-formed patterns in order to make it even harder for the smart hostile listener HCD1 to determine (isolate) the source of the jamming signal or to cancel the jamming signals.

The case where a friendly omni-directional jammer 1.2 is used, the signal SFS received in a first sector of the sectors of the hostile listener HCD1 can be expressed by $$y_{H_1}^{(1)} = s_j(t) + h_B(t) + n(t), \quad (1)$$

and the signal SSS received in a second sector of the sectors of the hostile listener HCD1 can be given by $$y_{H_1}^{(2)}(t) = s_j(t)*h_B(t) + s_d(t)*h_d(t) + n(t), \quad (2)$$

where n(t) is the additive white Gaussian noise term caused by the thermal noise of the receiving node HCD1, wherein. sj(t) is the jamming signal JS2.1 and wherein sd(t) is the meaningful signal OIS1 transmitted by the friendly node 1.1.

Equations 1 and 2 show the case where the system uses an omnidirectional jamming approach. The hostile node can invoke a cross-correlation function between these equations in order to cancel the jamming signal.

However, in the case of multi-sector jamming approach which is shown in FIG. 7, the signal SFS received in a first sector of the sectors of the hostile listener HCD1 can be expressed by $$y_{H_1}^{(3)}(t) = s_{j1}(t)*h_{j1}(t) + n(t), \quad (3)$$

and the signal SSS received in a second sector of the sectors of the hostile listener HCD1 can be given by $$y_{H_1}^{(4)}(t) = s_{j1}(t)*h_{j1}(t) + s_{j2}(t)*h_{j3}(t) + s_d(t)*h_d(t) + n(t). \quad (4)$$

wherein sj1(t) is the jamming signal JS2.1 and wherein si2(t) is the jamming signal JS2.2 which is different from the jamming signal JS2.1.

Equations 3 and 4 indicate the improvement in security measures as the hostile node HCD1 is not able to invoke the cross-correlation function between these two Equations as Equation 4 has a new additive term, sj2(t)*hj4(t), which is not correlated to any term at Equation 3.

Figure 8:
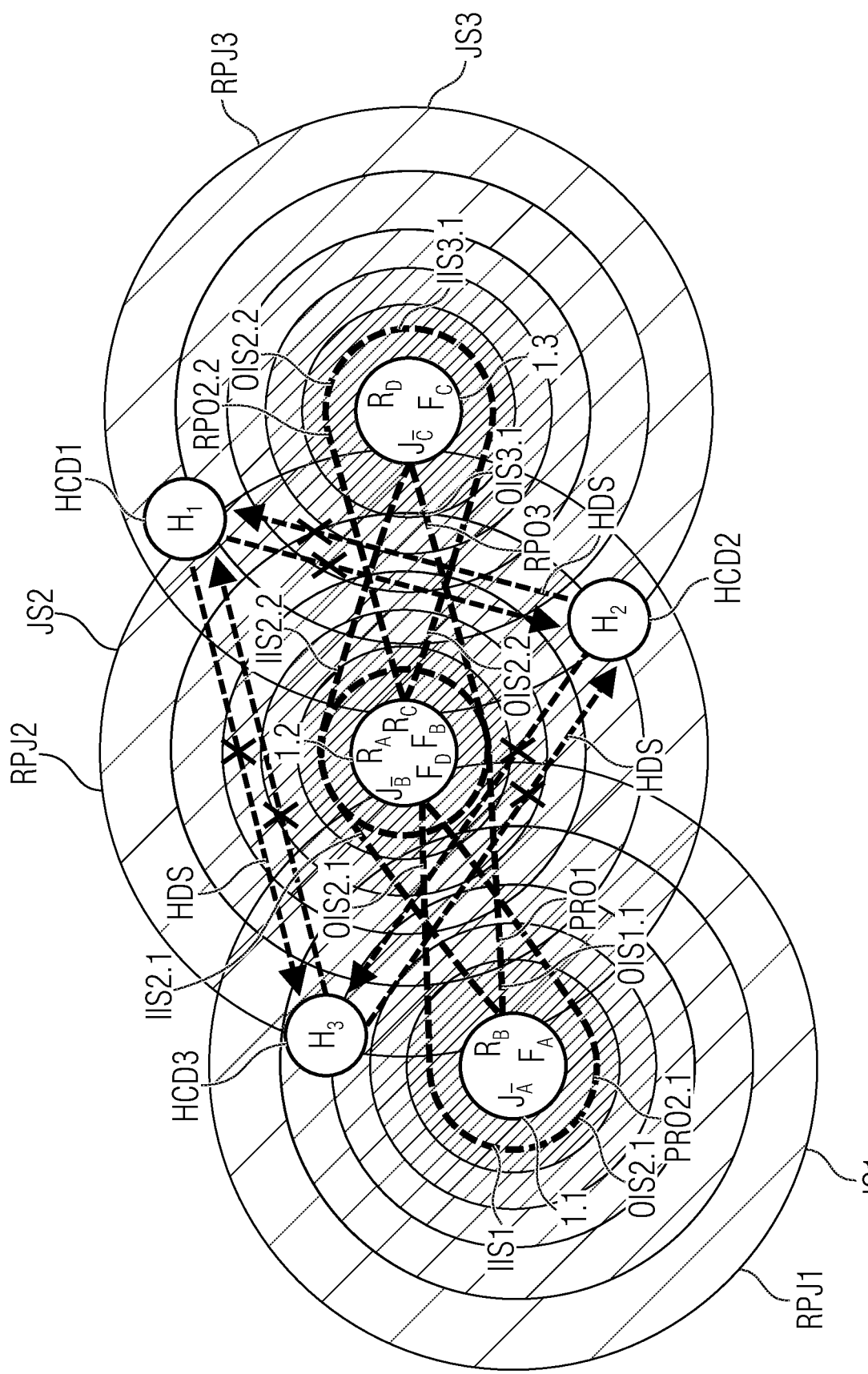
FIG. 8 illustrates functionalities of some embodiments of a radio frequency communication and jamming devices and an exemplary system comprising three radio frequency communication and jamming devices according to the invention in an exemplary environment in a schematic view.

FIG. 8 illustrates functionalities of some embodiments of radio frequency communication and jamming devices 1.1, 1.2 and 1.3 and an exemplary system comprising three radio frequency communication and jamming devices 1.1, 1.2 and 1.3 according to the invention in an exemplary environment in a schematic view.

In the following a scenario of three radio frequency communication and jamming devices 1.1, 1.2 and 1.3 is assumed. The radio frequency communication and jamming devices 1.1, 1.2 and 1.3 may for instance be carried by vehicles, which are either stationary or on the move distanced apart from each other. These vehicles want to exchange information over a secured wireless medium, whereas, denying any hostile device HCD1, HCD2 and HCD3 in their surrounding geographic area to establish or exchange data over the wireless medium. The wireless medium will be jammed by means of a multi-source (distributed) jamming points, i.e., each of the vehicles transmits a jamming signal to jam its surrounding space. Having many distributed jamming devices 1.1, 1.2 and 1.3 increases the covered jammed area. All the hostile communication links HDS within the jammed space will be disrupted, therefore, the hostile devices HCD1, HCD2 and HCD3 won't be able to communicate over the jammed frequency bands J. However, this system would be different from the ordinary (currently-used) jamming mechanism in which the friendly devices 1.1, 1.2 and 1.3 cannot exchange between them as the wireless medium was jammed by themselves. The invented techniques allow the vehicles to maintain physically-secured wireless links over the jammed medium. The technique basically relies on the self-interference cancellation capability where each of the jamming nodes 1.1, 1.2 and 1.3 suppresses its own jamming signal JS1, JS2 and JS3 locally—based on the perfect knowledge of the respective jamming signal JS1, JS2 and JS3 at the jammer itself—at one of jammed frequency bands. This unlocks this frequency band to a neighbor friendly node 1.1, 1.2 and 1.3 to transmit over this band. In this way, the communication can be secured by means of the jamming signal JS1, JS2 and JS3 from the destination device 1.1, 1.2 and 1.3, which is the only node 1.1, 1.2 and 1.3 that may decode the incoming meaningful signal IIS1, IIS2, IIS3 as it is the only device 1.1, 1.2 and 1.3 that can cancel its jamming signal JS1, JS2 and JS3. All hostile devices HCD1, HCD2 and HCD3 would not be able to decode the meaningful transmission signals IIS1, IIS2, IIS3 as they are not able to recover the jamming signals JS1, JS2 and JS3. It has to be noted that the transmitter in multi-band jamming operation does not jam its own meaningful transmission frequency band FA, FB, FC and relies for its own is transmission frequency band FA, FB, FC on the jamming capability of the receiver node 1.1, 1.2 and 1.3 (destination node) and perhaps the other friendly jammers 1.1, 1.2 and 1.3, while it continues in jamming the rest of the jamming-targeted bands. The given example was explained considering a scenario of three vehicles, however, the implementation is not restricted to vehicles or the count of three, it could be any kind of wireless devices to whatever count of them is to be part of the friendly physically-secured network.

The radio frequency communication and jamming device 1.2 is configured according to an embodiment of the invention. The receiver device 4 of the radiofrequency communication and jamming device 1.2 is configured for extracting the incoming information signal IIS2.1 and a further incoming information signal IIS2.2 from the incoming signals IS received via the receiving section 3, wherein the incoming signal IIS2.1 is in the receiving frequency band RA, wherein the further incoming signal IIS2.2 is in a further receiving frequency band RC, wherein the at least one jamming frequency band $\overline{JB}$ includes the further receiving frequency band RC;

wherein the transmitter device 11 is configured for generating the outgoing information signal OIS2.1 and a further outgoing information signal OIS2.2, wherein the further outgoing information signal OIS2.2 is transmitted via the transmission section 2 in a further transmission frequency band FD, which is not overlapping the frequency band FB of the outgoing information signal OIS2.1; and wherein the further transmission frequency band FD and the further receiving frequency RC band do not overlap.

According to an embodiment of the invention the system further comprises:

a third radio frequency communication and jamming device 1.3 being configured for physically secured friendly radio frequency communication and for jamming hostile radio frequency communication, wherein the third radio frequency communication and jamming device 1.3 comprises: an antenna arrangement 2, 3 having a transmission section 2 for transmitting outgoing signals OS and a receiving section 3 for receiving incoming signals IS, a receiver device 4 configured for extracting an incoming information signal IIS3.1 from the incoming signals IS received via the receiving section 3 in a receiving frequency band RD, a jamming generator 5 configured for generating at least one jamming signal JS3 for jamming at least one jamming frequency band JC, wherein the jamming signal JS3 is transmitted as one of the outgoing signals OS via the transmission section 2, wherein the at least one jamming frequency band JC includes the receiving frequency band RD, a self-interference cancellation device 6 configured for cancelling portions of the at least one jamming signal JS3 in the incoming signals IS received via the receiving section 3 at least in the receiving frequency band RD, and a transmitter device 11 configured for generating at least one outgoing information signal OIS3.1 in a transmission frequency band FC, wherein the outgoing information signal OIS3.1 is transmitted as one of the outgoing signals OS via the transmission section 2, wherein the transmission frequency band FC and the receiving frequency band RD do not overlap, wherein the at least one jamming frequency band $\overline{JC}$ excludes the transmission frequency band FC;

wherein the second radio frequency communication and jamming device 1.2 comprises the features that the receiver device 4 is configured for extracting the incoming information signal IIS2.1 and a further incoming information signal IIS2.2 from the incoming signals IS received via the receiving section 3, wherein the incoming signal IIS2.1 is in the receiving frequency band RA, wherein the further incoming signal IIS2.2 is in a further receiving frequency band RC, wherein the at least one jamming frequency band $\overline{JB}$ includes the further receiving frequency band RC, wherein the transmitter device 11 is configured for generating the outgoing information signal OIS2.1 and a further outgoing information signal OIS2.2, wherein the further outgoing information signal OIS2.2 is transmitted via the transmission section 2 in a further transmission frequency band FD, which is not overlapping the frequency band FB of the outgoing information signal OIS2.1, wherein the further transmission frequency band FD and the further receiving frequency RC band do not overlap;

wherein the receiving frequency band RD of the third radio frequency communication and jamming device 1.3 includes the further transmission frequency band FD of the second radio frequency communication and jamming device 1.2;

wherein the further receiving frequency band RC of the second radio frequency communication and jamming device 1.2 includes the transmission frequency band FC of the third radio frequency communication and jamming device 1.3;

wherein the first radio frequency communication and jamming device 1.1 and the third radio frequency communication and jamming device 1.3 are located in reach of the second radio frequency communication and jamming device 1.2;

wherein the first radio frequency communication and jamming device 1.1 and the third radio frequency communication and jamming device 1.3 are located mutually out of reach;

wherein the further outgoing information signal OIS2.2 of the second radio frequency communication and jamming device 1.2 is the incoming information signal IIS3.1 of the third radio frequency communication and jamming device 1.3; and wherein the outgoing information signal OIS3.1 of the third radio frequency communication and jamming device 1.3 is the further incoming information signal IIS2.2 of the second radio frequency communication and jamming device 1.2.

Each middle node 1.2 (not the edge nodes 1.1 and 1.3) needs three frequency bands in order to connect bidirectionally to its neighboring friendly nodes 1.1, 1.2, 1.3. The middle node 1.2 in this case does not need any directional of arrival (DOA) functionality to split the neighbor's connection links.

Figure 9:
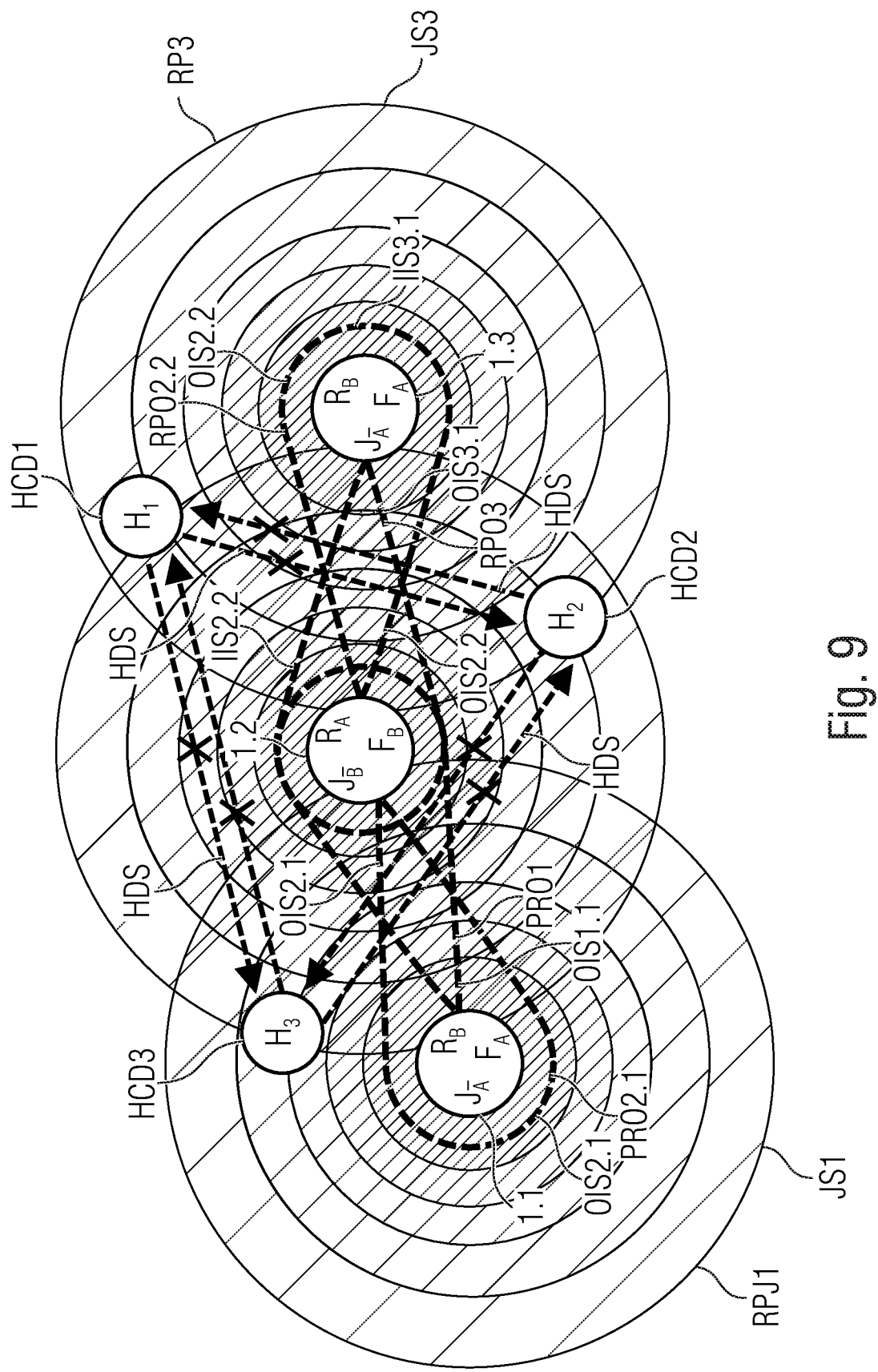
FIG. 9 illustrates functionalities of some embodiments of a radio frequency communication and jamming devices and a further exemplary system comprising three radio frequency communication and jamming devices according to the invention in an exemplary environment in a schematic view.

FIG. 9 illustrates functionalities of some embodiments of radio frequency communication and jamming devices 1.1, 1.2 and 1.3 and a further exemplary system comprising three radio frequency communication and jamming devices 1.1, 1.2 and 1.3 according to the invention in an exemplary environment in a schematic view.

The radio frequency communication and jamming device 1.2 of the radiofrequency communication and jamming device 1.2 is configured according to an embodiment of the invention. The receiving section 3 is configured for receiving the incoming information signal IIS2.1 and a further incoming information signal IIS2.2 of the incoming information signals IS, which are in the same receiving frequency band RA;

wherein the receiving section 3 comprises a direction estimation unit 15 configured for estimating a direction of origin for both of the incoming information signal IIS2.1 and the further information signal;

wherein the receiver device 4 is configured for extracting the incoming information signal IIS2.1 and a further incoming information signal IIS2.2 from the incoming signals IS received via the receiving section 3 using the estimated directions of origin; and wherein the transmitter device 11 is configured for generating the outgoing information signal OIS2.1 and a further outgoing information signal OIS2.2, wherein the further outgoing information signal OIS2.2 is transmitted via the transmission section 2 in the transmission frequency band FB.

According to an embodiment of the invention the system further comprises:

a third radio frequency communication and jamming device 1.3 being configured for physically secured friendly radio frequency communication and for jamming hostile radio frequency communication, wherein the third radio frequency communication and jamming device 1.3 comprises: an antenna arrangement 2, 3 having a transmission section 2 for transmitting outgoing signals OS and a receiving section 3 for receiving incoming signals IS, a receiver device 4 configured for extracting an incoming information signal IIS3.1 from the incoming signals IS received via the receiving section 3 in a receiving frequency band RB, a jamming generator 5 configured for generating at least one jamming signal JS3 for jamming at least one jamming frequency band $\overline{JA}$, wherein the jamming signal JS3 is transmitted as one of the outgoing signals OS via the transmission section 2, wherein the at least one jamming frequency band $\overline{JA}$ includes the receiving frequency band RB, a self-interference cancellation device 6 configured for cancelling portions of the at least one jamming signal JS3 in the incoming signals IS received via the receiving section 3 at least in the receiving frequency band RB, and a transmitter device 11 configured for generating at least one outgoing information signal OIS3.1 in a transmission frequency band FA, wherein the outgoing information signal OIS3.1 is transmitted as one of the outgoing signals OS via the transmission section 2, wherein the transmission frequency band FA and the receiving frequency band RB do not overlap, wherein the at least one jamming frequency band $\overline{JA}$ excludes the transmission frequency band FB;

wherein the receiving frequency band RB of the third radio frequency communication and jamming device 1.3 includes the transmission frequency band FB of the second radio frequency communication and jamming device 1.2;

wherein the receiving frequency band RA of the second radio frequency communication and jamming device 1.2 includes the transmission frequency band FA of the third radio frequency communication and jamming device 1.3;

wherein the first radio frequency communication and jamming device 1.1 and the third radio frequency communication and jamming device 1.3 are located in reach of the second radio frequency communication and jamming device 1.2;

wherein the first radio frequency communication and jamming device 1.1 and the third radio frequency communication and jamming device 1.3 are located mutually out of reach;

wherein the transmission frequency band FA of the first frequency communication and jamming device 1.1 is equal to the transmission frequency band FA of the first frequency communication and jamming device 1.1;

wherein the second radio frequency communication and jamming device 1.2 comprises the features that the receiving section 3 is configured for receiving the incoming information signal IIS2.1 and a further incoming information signal IIS2.2 of the incoming information signals IS, which are in the same receiving frequency band RA, wherein the receiving section 3 comprises a direction estimation unit 15 configured for estimating a direction of origin for both of the incoming information signal IIS2.1 and the further information signal, wherein the receiver device 4 is configured for extracting the incoming information signal IIS2.1 and a further incoming information signal IIS2.2 from the incoming signals IS received via the receiving section 3 using the estimated directions of origin, and wherein the transmitter device 11 is configured for generating the outgoing information signal OIS2.1 and a further outgoing information signal OIS2.2, wherein the further outgoing information signal OIS2.2 is transmitted via the transmission section 2 in the transmission frequency band FB;

wherein the further outgoing information signal OIS2.2 of the second radio frequency communication and jamming device 1.2 is the incoming information signal IIS3.1 of the third radio frequency communication and jamming device 1.3; and wherein the outgoing information signal OIS3.1 of the third radio frequency communication and jamming device 1.3 is the further incoming information signal IIS2.2 of the second radio frequency communication and jamming device 1.2.

In the example of FIG. 9 the middle node 1.2 can distinguish the direction of arrival (DOA) of multiple simultaneous signals. Hence, both neighboring nodes 1.1 and 1.3 can use the same transmission frequency bands FA. Thus, the number of the needed frequency bands FA, FB could be reduced to two instead of three. One benefit of such band reusing feature in terms of security is that the less number of bands is needed for meaningful information signals transmission, the more bands can be jointly jammed by devices themselves. Accordingly, this means an overall enhancement on the security standards of the system.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] S. Gollakota, H. Hassanieh, B. Ransford, D. Katabi, and K. Fu, "They can hear your heartbeats: Non-invasive security for implantable medical devices," in Proceedings of the ACM SIGCOMM 2011 Conference, ser. SIGCOMM '11. New York, N.Y., USA: ACM, 2011, pp. 2-13. [Online] Available: http://doi.acm.org/10.1145/2018436.2018438]

[2] G. Zheng, I. Krikidis, J. Li, A. P. Petropulu, and B. Ottersten, "Improving physical layer secrecy using full-duplex jamming receivers," IEEE Transactions on Signal Processing, vol. 61, no. 20, pp. 4962-4974, October 2013.

[3] F. Zhu, F. Gao, M. Yao, and H. Zou, "Joint information- and jamming-beamforming for physical layer security with full duplex base station," IEEE Transactions on Signal Processing, vol. 62, no. 24, pp. 6391-6401, December 2014.

[4] G. Chen, Y. Gong, P. Xiao, and J. A. Chambers, "Physical layer network security in the full-duplex relay system," IEEE Transactions on Information Forensics and Security, vol. 10, no. 3, pp. 574-583, March 2015.

[5] R. Askar, T. Kaiser, B. Schubert, T. Haustein, and W. Keusgen, "Active self-interference cancellation mechanism for full-duplex wireless transceivers," in Cognitive Radio Oriented Wireless Networks and Communications (CROWNCOM), 2014 9th International Conference on, 2014, pp. 539-544.

[6] R. Askar, B. Schubert, W. Keusgen, and T. Haustein, "Full-Duplex wireless transceiver in presence of I/Q mismatches: Experimentation and estimation algorithm," in IEEE GC 2015 Workshop on Emerging Technologies for 5G Wireless Cellular Networks—4th International (GC'15—Workshop—ETSG), San Diego, USA, 2015.

[7] R. Askar, N. Zarifeh, B. Schubert, W. Keusgen, and T. Kaiser, "I/Q imbalance calibration for higher self-interference cancellation levels in full-duplex wireless transceivers," in 5G for Ubiquitous Connectivity (5GU), 2014 1st International Conference on, 2014, pp. 92-97.

[8] R. Askar, B. Schubert, W. Keusgen, and T. Haustein, "Agile Full-Duplex Transceiver: The Concept and Self-Interference Channel Characteristics," in European Wireless 2016, pp. 269-275.

[9] WO 2017/008851 A1

The invention claimed is:

1. A radio frequency communication and jamming device configured for physically securing friendly radio frequency communication and for jamming hostile radio frequency communication, the radio frequency communication and jamming device comprising:
   an antenna arrangement comprising a transmission section for transmitting outgoing signals and a receiving section for receiving incoming signals;
   a receiver device configured for extracting an incoming information signal from the incoming signals received via the receiving section in a receiving frequency band;
   a jamming generator configured for generating at least one jamming signal for jamming at least one jamming frequency band, wherein the at least one jamming signal is transmitted as one of the outgoing signals via the transmission section, and wherein the at least one jamming frequency band comprises the receiving frequency band; and
   a self-interference cancellation device configured for cancelling portions of the at least one jamming signal in the incoming signals received via the receiving section at least in the receiving frequency band,
   wherein the transmission section comprises a first radiation pattern control unit configured for adapting a radiation pattern for transmitting at least one outgoing information signal and/or a second radiation pattern control unit configured for adapting a radiation pattern for transmitting the at least one jamming signal.

2. The radio frequency communication and jamming device according to claim 1, wherein the self-interference cancellation device comprises an inserting device for inserting a self-interference cancelation signal into the incoming signals downstream of the receiving section and a self-interference cancelation signal calculating device for calculating the self-interference cancelation signal from the at least one jamming signal.

3. The radio frequency communication and jamming device according to claim 1, wherein the radio frequency communication and jamming device further comprises:
   a transmitter device configured for generating the at least one outgoing information signal in a transmission frequency band,
   wherein the at least one outgoing information signal is transmitted as one of the outgoing signals via the transmission section,
   wherein the transmission frequency band and the receiving frequency band do not overlap, and
   wherein the at least one jamming frequency band excludes the transmission frequency band.

4. The radio frequency communication and jamming device according to claim 3, wherein the receiver device is configured for extracting the incoming information signal and a further incoming information signal from the incoming signals received via the receiving section, wherein the incoming information signal is in the receiving frequency band, wherein the further information incoming signal is in a further receiving frequency band, wherein the at least one jamming frequency band comprises the further receiving frequency band;
   wherein the transmitter device is configured for generating the at least one outgoing information signal and a further outgoing information signal, wherein the further outgoing information signal is transmitted via the transmission section in a further transmission frequency band, which is not overlapping the frequency band of the at least one outgoing information signal; and wherein the further transmission frequency band and the further receiving frequency band do not overlap.

5. The radio frequency communication and jamming device according to claim 3, wherein the receiving section is configured for receiving the incoming information signal and a further incoming information signal of the incoming signals, which are in the same receiving frequency band;

wherein the receiving section comprises a direction estimation unit configured for estimating directions of origin for both of the incoming information signal and the further incoming information signal;

wherein the receiver device is configured for extracting the incoming information signal and the further incoming information signal from the incoming signals received via the receiving section using the estimated directions of origin; and wherein the transmitter device is configured for generating the at least one outgoing information signal and a further outgoing information signal, wherein the further outgoing information signal is transmitted via the transmission section in the transmission frequency band.

6. The radio frequency communication and jamming device according to claim 1, wherein the transmission section comprises a power control unit configured for adapting a power of the at least one jamming signal.

7. The radio frequency communication and jamming device according to claim 1, wherein the jamming generator is configured for generating a plurality of jamming signals for jamming the at least one jamming frequency band, wherein the plurality of jamming signals comprise different characteristics, wherein the transmission section comprises a plurality of transmission channels, wherein each jamming signal of the plurality of jamming signals is transmitted over one transmission channel of the plurality of transmission channels, and wherein the plurality of transmission channels comprise different radiation patterns for transmitting the respective jamming signal.

8. A radio frequency communication and jamming device configured for physically securing friendly radio frequency communication and for jamming hostile radio frequency communication, the radio frequency communication and jamming device comprising:

an antenna arrangement comprising a transmission section for transmitting outgoing signals and a receiving section for receiving incoming signals;

a receiver device configured for extracting an incoming information signal from the incoming signals received via the receiving section in a receiving frequency band;

a jamming generator configured for generating at least one jamming signal for jamming at least one jamming frequency band, wherein the at least one jamming signal is transmitted as one of the outgoing signals via the trans-mission section, and wherein the at least one jamming frequency band comprises the receiving frequency band; and a self-interference cancellation device configured for cancelling portions of the at least one jamming signal in the incoming signals received via the receiving section at least in the receiving frequency band, wherein the receiving section comprises a direction estimation unit configured for estimating a direction from which the incoming information signal is arriving.

9. The radio frequency communication and jamming device according to claim 8, wherein the direction estimation unit is configured for adapting a receiving pattern for receiving the incoming information signal based on the estimated direction.

10. A system for physically securing friendly radio frequency communication and for jamming hostile radio frequency communication, the system comprising:

a first radio frequency communication and jamming device and a second radio frequency communication and jamming device;

wherein each of the first and second radio frequency communication and jamming devices is configured for physically securing friendly radio frequency communication and for jamming hostile radio frequency communication, and comprises:

an antenna arrangement comprising a transmission section for transmitting outgoing signals and a receiving section for receiving incoming signals;

a receiver device configured for extracting an incoming information signal from the incoming signals received via the receiving section in a receiving frequency band;

a jamming generator configured for generating at least one jamming signal for jamming at least one jamming frequency band, wherein the at least one jamming signal is transmitted as one of the outgoing signals via the transmission section, and wherein the at least one jamming frequency band comprises the receiving frequency band;

a self-interference cancellation device configured for cancelling portions of the at least one jamming signal in the incoming signals received via the receiving section at least in the receiving frequency band; and a transmitter device configured for generating at least one outgoing information signal in a transmission frequency band, wherein the at least one outgoing information signal is transmitted as one of the outgoing signals via the transmission section, and wherein the transmission frequency band and the receiving frequency band do not overlap, wherein the at least one jamming frequency band excludes the transmission frequency band, wherein the receiving frequency band of the first radio frequency communication and jamming device comprises the transmission frequency band of the second radio frequency communication and jamming device, wherein the receiving frequency band of the second radio frequency communication and jamming device comprises the transmission frequency band of the first radio frequency communication and jamming device, wherein the at least one outgoing information signal of the first radio frequency communication and jamming device is the incoming information signal of the second radio frequency communication and jamming device, and wherein the at least one outgoing information signal of the second radio frequency communication and jamming device is the incoming information signal of the first radio frequency communication and jamming device, the system further comprising:

a third radio frequency communication and jamming device configured for physically securing friendly radio frequency communication and for jamming hostile radio frequency communication, and comprising:

an antenna arrangement comprising a transmission section for transmitting outgoing signals and a receiving section for receiving incoming signals;

a receiver device configured for extracting an incoming information signal from the incoming signals received via the receiving section in a receiving frequency band;

a jamming generator configured for generating at least one jamming signal for jamming at least one jamming frequency band, wherein the at least one jamming signal is transmitted as one of the outgoing signals via the transmission section, and wherein the at least one jamming frequency band comprises the receiving frequency band;

a self-interference cancellation device configured for cancelling portions of the at least one jamming signal in the incoming signals received via the receiving section at least in the receiving frequency band; and a transmitter device configured for generating at least one outgoing information signal in a transmission frequency band, wherein the at least one outgoing information signal is transmitted as one of the outgoing signals via the transmission section, and wherein the transmission frequency band and the receiving frequency band do not overlap, wherein the at least one jamming frequency band excludes the transmission frequency band, wherein the receiver device of the second radio frequency communication and jamming device is configured for extracting the incoming information signal and a further incoming information signal from the incoming signals received via the receiving section, wherein the incoming signal is in the receiving frequency band, wherein the further incoming signal is in a further receiving frequency band, wherein the at least one jamming frequency band comprises the further receiving frequency band, wherein the transmitter device of the second radio frequency communication and jamming device is configured for generating the at least one outgoing information signal and a further outgoing information signal, wherein the further outgoing information signal is transmitted via the transmission section in a further transmission frequency band, which is not overlapping the frequency band of the at least one outgoing information signal, wherein the further transmission frequency band and the further receiving frequency band do not overlap, wherein the receiving frequency band of the third radio frequency communication and jamming device comprises the further transmission frequency band of the second radio frequency communication and jamming device, wherein the further receiving frequency band of the second radio frequency communication and jamming device comprises the transmission frequency band of the third radio frequency communication and jamming device, wherein the first radio frequency communication and jamming device and the third radio frequency communication and jamming device are located in reach of the second radio frequency communication and jamming device, wherein the first radio frequency communication and jamming device and the third radio frequency communication and jamming device are located mutually out of reach, wherein the further outgoing information signal of the second radio frequency communication and jamming device is the incoming information signal of the third radio frequency communication and jamming device, and wherein the at least one outgoing information signal of the third radio frequency communication and jamming device is the further incoming information signal of the second radio frequency communication and jamming device.

11. A system for physically securing friendly radio frequency communication and for jamming hostile radio frequency communication, the system comprising:

a first radio frequency communication and jamming device and a second radio frequency communication and jamming device;

wherein each of the first and second radio frequency communication and jamming devices are configured for physically securing friendly radio frequency communication and for jamming hostile radio frequency communication, and comprise:

an antenna arrangement comprising a transmission section for transmitting outgoing signals and a receiving section for receiving incoming signals;

a receiver device configured for extracting an incoming information signal from the incoming signals received via the receiving section in a receiving frequency band;

a jamming generator configured for generating at least one jamming signal for jamming at least one jamming frequency band, wherein the at least one jamming signal is transmitted as one of the outgoing signals via the transmission section, and wherein the at least one jamming frequency band comprises the receiving frequency band;

a self-interference cancellation device configured for cancelling portions of the at least one jamming signal in the incoming signals received via the receiving section at least in the receiving frequency band; and a transmitter device configured for generating at least one outgoing information signal in a transmission frequency band, wherein the at least one outgoing information signal is transmitted as one of the outgoing signals via the transmission section, and wherein the transmission frequency band and the receiving frequency band do not overlap, wherein the at least one jamming frequency band excludes the transmission frequency band, wherein the receiving frequency band of the first radio frequency communication and jamming device comprises the transmission frequency band of the second radio frequency communication and jamming device, wherein the receiving frequency band of the second radio frequency communication and jamming device comprises the transmission frequency band of the first radio frequency communication and jamming device, wherein the at least one outgoing information signal of the first radio frequency communication and jamming device is the incoming information signal of the second radio frequency communication and jamming device, and wherein the at least one outgoing information signal of the second radio frequency communication and jamming device is the incoming information signal of the first radio frequency communication and jamming device, the system further comprising:

a third radio frequency communication and jamming device configured for physically securing friendly radio frequency communication and for jamming hostile radio frequency communication, and comprising:

an antenna arrangement comprising a transmission section for transmitting outgoing signals and a receiving section for receiving incoming signals;

a receiver device configured for extracting an incoming information signal from the incoming signals received via the receiving section in a receiving frequency band;

a jamming generator configured for generating at least one jamming signal for jamming at least one jamming frequency band, wherein the at least one jamming signal is transmitted as one of the outgoing signals via the transmission section, and wherein the at least one jamming frequency band comprises the receiving frequency band;

a self-interference cancellation device configured for cancelling portions of the at least one jamming signal in the incoming signals received via the receiving section at least in the receiving frequency band and a transmitter device configured for generating at least one outgoing information signal in a transmission frequency band, wherein the at least one outgoing information signal is transmitted as one of the outgoing signals via the transmission section, and wherein the transmission frequency band and the receiving frequency band do not overlap, wherein the at least one jamming frequency band excludes the transmission frequency band, wherein the receiving frequency band of the third radio frequency communication and jamming device comprises the transmission frequency band of the second radio frequency communication and jamming device, wherein the receiving frequency band of the second radio frequency communication and jamming device comprises the transmission frequency band of the third radio frequency communication and jamming device, wherein the first radio frequency communication and jamming device and the third radio frequency communication and jamming device are located in reach of the second radio frequency communication and jamming device, wherein the first radio frequency communication and jamming device and the third radio frequency communication and jamming device are located mutually out of reach, wherein the transmission frequency band of the first frequency communication and jamming device is equal to the transmission frequency band of the first frequency communication and jamming device, wherein the receiver device of the second radio frequency communication and jamming device is configured for extracting the incoming information signal and a further incoming information signal from the incoming signals received via the receiving section, wherein the incoming signal is in the receiving frequency band, wherein the further incoming signal is in a further receiving frequency band, wherein the at least one jamming frequency band comprises the further receiving frequency band, wherein the transmitter device of the second radio frequency communication and jamming device is configured for generating the at least one outgoing information signal and a further outgoing information signal, wherein the further outgoing information signal is transmitted via the transmission section in a further transmission frequency band, which is not overlapping the frequency band of the at least one outgoing information signal, wherein the further transmission frequency band and the further receiving frequency band do not overlap, wherein the receiving section is configured for receiving the incoming information signal and a further incoming information signal of the incoming information signals, which are in the same receiving frequency band, wherein the receiving section comprises a direction estimation unit configured for estimating a direction of origin for both of the incoming information signal and the further information signal, wherein the receiver device is configured for extracting the incoming information signal and a further incoming information signal from the incoming signals received via the receiving section using the estimated directions of origin, wherein the transmitter device is configured for generating the at least one outgoing information signal and a further outgoing information signal, wherein the further outgoing information signal is transmitted via the transmission section in the transmission frequency band, wherein the further outgoing information signal of the second radio frequency communication and jamming device is the incoming information signal of the third radio frequency communication and jamming device, and wherein the at least one outgoing information signal of the third radio frequency communication and jamming device is the further incoming information signal of the second radio frequency communication and jamming device.

12. A method for physically securing friendly radio frequency communication and for jamming hostile radio frequency communication, the method comprising:

transmitting outgoing signals by using a transmission section of an antenna arrangement and receiving incoming signals by using a receiving section of the antenna arrangement;

extracting an incoming information signal from the incoming signals received via the receiving section in a receiving frequency band by using a receiver device;

generating at least one jamming signal for jamming at least one jamming frequency band by using a jamming generator, wherein the at least one jamming signal is transmitted as one of the outgoing signals via the transmission section, and wherein the at least one jamming frequency band comprises the receiving frequency band;

cancelling portions of the at least one jamming signal in the incoming signals received via the receiving section at least in the receiving frequency band by using a self-interference cancellation device; and adapting a radiation pattern for transmitting at least one outgoing information signal by using a first radiation pattern control unit of the transmission section and/or adapting a radiation pattern for transmitting the at least one jamming signal by using a second radiation pattern control unit of the transmission section.

13. A non-transitory digital storage medium having a computer program stored thereon to perform a method for physically securing friendly radio frequency communication and for jamming hostile radio frequency communication, the method comprising:
   transmitting outgoing signals by using a transmission section of an antenna arrangement and receiving incoming signals by using a receiving section of the antenna arrangement;
   extracting an incoming information signal from the incoming signals received via the receiving section in a receiving frequency band by using a receiver device;
   generating at least one jamming signal for jamming at least one jamming frequency band by using a jamming generator, wherein the at least one jamming signal is transmitted as one of the outgoing signals via the transmission section, and wherein the at least one jamming frequency band comprises the receiving frequency band;
   cancelling portions of the at least one jamming signal in the incoming signals received via the receiving section at least in the receiving frequency band by using a self-interference cancellation device; and
   adapting a radiation pattern for transmitting at least one outgoing information signal by using a first radiation pattern control unit of the transmission section and/or adapting a radiation pattern for transmitting the at least one jamming signal by using a second radiation pattern control unit of the transmission section,
when said computer program is run by a computer.

* * * * *